(12) United States Patent
Kobayashi et al.

(10) Patent No.: US 11,269,188 B2
(45) Date of Patent: Mar. 8, 2022

(54) DISPLAY SYSTEM, CONTROL PROGRAM FOR INFORMATION PROCESSING DEVICE, METHOD FOR CONTROLLING INFORMATION PROCESSING DEVICE, AND DISPLAY DEVICE

(71) Applicant: SEIKO EPSON CORPORATION, Tokyo (JP)

(72) Inventors: Shinichi Kobayashi, Azumino (JP); Yuichi Mori, Minowa-Machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/015,087

(22) Filed: Sep. 9, 2020

(65) Prior Publication Data

US 2021/0072548 A1    Mar. 11, 2021

(30) Foreign Application Priority Data

Sep. 10, 2019  (JP) .............................. JP2019-164581

(51) Int. Cl.
*G02B 27/01*  (2006.01)

(52) U.S. Cl.
CPC .... *G02B 27/0172* (2013.01); *G02B 2027/014* (2013.01); *G02B 2027/0138* (2013.01); *G02B 2027/0178* (2013.01)

(58) Field of Classification Search
CPC ........ G02B 27/0172; G02B 2027/0138; G02B 2027/0178; G02B 2027/014; G02B 2027/0134
See application file for complete search history.

(56) References Cited

U.S. PATENT DOCUMENTS

| 2012/0242560 | A1 | 9/2012 | Nakada et al. | |
| 2017/0308258 | A1* | 10/2017 | Xu | G06T 7/70 |
| 2018/0143681 | A1* | 5/2018 | Myung | G06F 3/04815 |
| 2018/0164589 | A1* | 6/2018 | Watanabe | G02B 27/0101 |

FOREIGN PATENT DOCUMENTS

JP          2012204998          10/2012

* cited by examiner

*Primary Examiner* — Alexander Eisen
*Assistant Examiner* — Kebede T Teshome
(74) *Attorney, Agent, or Firm* — JCIPRNET

(57) ABSTRACT

An HMD is coupled to a smart phone. The HMD displays a first image overlapping an external scene in a left display unit, and displays a second image corresponding to the first image overlapping the external scene in a right display unit. The smart phone includes a display panel displaying a third image, a first detector detecting that at least one of the first image and the second image overlaps the third image, and an adjustment unit adjusting, based on a detection result of the first detector, at least one of the first image and the second image such that the third image is visible.

12 Claims, 11 Drawing Sheets

DISPLAY SYSTEM, CONTROL PROGRAM FOR INFORMATION PROCESSING DEVICE, METHOD FOR CONTROLLING INFORMATION PROCESSING DEVICE, AND DISPLAY DEVICE

The present application is based on, and claims priority from JP Application Serial Number 2019-164581, filed Sep. 10, 2019, the disclosure of which is hereby incorporated by reference herein in its entirety.

BACKGROUND

1. Technical Field

The present disclosure relates to a display system, a control program for an information processing device, a method for the information processing device, and a display device.

2. Related Art

When an operating surface of a control unit of a head-mounted display apparatus is operated, a technique for improving visibility of the operating surface of the control unit has been known (see, for example, JP-A-2012-204998).

The head-mounted display apparatus described in JP-A-2012-204998 includes an image display unit that includes an imaging light generating unit for generating and exiting imaging light representing an image, and a light-guiding unit for guiding the exited imaging light to an eye of a user, and causes the user to view a virtual image, a control unit having an operating surface, coupled to the image display unit, and controlling image display by the image display unit, and an orientation determining unit for determining whether the user faces the operating surface of the control unit or not. The control unit, when the user is determined to face the operating surface of the control unit, in order to reduce visibility of the virtual image, adjusts brightness in the imaging light generation unit, or adjusts the imaging light generated by the imaging light generation unit.

In the head-mounted display apparatus described in JP-A-2012-204998, when the user is determined to face the operating surface of the control unit, visibility of an image displayed on the image display unit is reduced, thus there was a case in which the image displayed on the image display unit is difficult to see.

In addition, also when the head-mounted display apparatus is coupled to an information processing device such as a smart phone, and the user operates the information processing device, visibility of an image displayed on the image display unit is reduced, thus there was a case in which the image displayed on the image display unit is difficult to see.

For example, when a touch panel of a smart phone is used to adjust brightness of an image displayed on the image display unit, visibility of the image displayed on the image display unit is reduced, thus, there was a possibility that operability is reduced.

SUMMARY

An aspect for solving the above-described problem is a display system including a display device mounted on a head of a user, and an information processing device to which the display device is coupled, wherein the display device includes a first display unit located at a left eye side of the user and displaying a first image overlapping an external scene, and a second display unit located at a right eye side of the user and displaying a second image corresponding to the first image overlapping the external scene, the information processing device includes a third display unit displaying a third image, a first detector detecting that at least one of the first image and the second image overlaps the third image, an adjustment unit adjusting, based on a detection result in the first detector, an image of at least one of the first image and the second image such that the third image is visible, and a display control unit causing, based on an adjustment result of the adjustment unit, the first display unit to display the first image, and causing the second display unit to display the second image.

The above display system may be configured such that, the adjustment unit adjusts the image of at least one of the first image and the second image such that the second image differs from the first image.

The above display system may be configured such that, the adjustment unit, when the first detector detects that the first image overlaps the third image, adjusts the first image, and when the first detector detects that the second image overlaps the third image, adjusts the second image.

The above display system may be configured such that, the adjustment unit, when the first detector detects that the first image overlaps the third image, prohibits display of the first image, and when the first detector detects that the second image overlaps the third image, prohibits display of the second image.

The above display system may be configured such that, the adjustment unit, when the first detector detects that the first image overlaps the third image, adjusts transmittance of the first image, and when the first detector detects that the second image overlaps the third image, adjusts transmittance of the second image.

The above display system may be configured such that, the information processing device includes a second detector that, when the first detector detects that the first image overlaps the third image, detects a first overlapping region indicating a region where the first image overlaps the third image, and that, when the first detector detects that the second image overlaps the third image, detects a second overlapping region indicating a region where the second image overlaps the third image, and the adjustment unit adjusts, based on a detection result of the second detector, an image of at least one of the first image and the second image.

The above display system may be configured such that, the adjustment unit, when the first detector detects that the first image overlaps the third image, prohibits display of the first overlapping region in the first image, and when the first detector detects that the second image overlaps the third image, prohibits display of the second overlapping region in the second image.

The above display system may be configured such that, the adjustment unit, when the first detector detects that the first image overlaps the third image, adjusts transmittance of the first overlapping region in the first image, and when the first detector detects that the second image overlaps the third image, adjusts transmittance of the second overlapping region in the second image.

The above display system may be configured such that, the display device includes a first imaging unit for image-capturing a first imaging range of the external scene, the first detector detects, based on an imaging result of the first imaging unit, that at least one of the first image and the second image overlaps the third image, and the second detector detects, based on the imaging result of the first imaging unit, the first overlapping region, and the second overlapping region.

The above display system may be configured such that, the display device includes the first imaging unit for image-capturing the first imaging range of the external scene, the information processing device includes a first determining unit determining, based on the imaging result of the first imaging unit, whether the information processing device is grasped by a left hand or grasped by a right hand, the first detector, when the first determining unit determines that the information processing device is grasped by the left hand, detects that the first image overlaps the third image, and when the first determining unit determines that the information processing device is grasped by the right hand, detects that the second image overlaps the third image.

The above display system may be configured such that, the information processing device includes a second determining unit determining whether the third display unit faces the display device, and when the second determining unit determines that the third display unit faces the display device, the adjustment unit adjusts an image of at least one of the first image and the second image.

The display system may be configured such that, the display device includes the first imaging unit image-capturing a first imaging range of the external scene, the information processing device includes a second imaging unit image-capturing a second imaging range of the external scene, and the second determining unit determines, based on the image captured by the first imaging unit, and an image captured by the second imaging unit, whether the third display unit of the information processing device faces the display device.

Another aspect for solving the above-described problem is a control program for an information processing device to which a display device is coupled, the display device being mounted on a head of a user and including a first display unit located at a left eye side of the user and displaying a first image overlapping an external scene and a second display unit located at a right eye side of the user and displaying a second image corresponding to the first image overlapping the external scene, and which includes a third display unit displaying a third image, and moreover which includes a computer, wherein the computer is caused to function as a detector detecting that at least one of the first image and the second image overlaps the third image, as an adjustment unit adjusting, based on a detection result of the detector, an image of at least one of the first image and the second image such that the third image is visible, and as a display control unit causing, based on an adjustment result of the adjustment unit, the first display unit to display the first image, and causing the second display unit to display the second image.

Still another aspect for solving the above-described problem is a method for controlling an information processing device to which a display device is coupled, the display device being mounted on a head of a user and including a first display unit located at a left eye side of the user and displaying a first image overlapping an external scene and a second display unit located at a right eye side of the user and displaying a second image corresponding to the first image overlapping the external scene, and which includes a third display unit displaying a third image, and moreover includes a computer, the control method including a detection step of detecting by the computer that at least one of the first image and the second image overlaps the third image, an adjustment step of adjusting by the computer an image of at least one of the first image and the second image, based on a detection result in the detection step, such that the third image is visible, and a display control step for causing by the computer the first display unit to display the first image, and causing by the computer the second display unit to display the second image, based on an adjustment result in the adjustment step.

Yet another aspect for solving the above-described problem is a display device including a displaying unit mounted on a head of a user, an information processing device including a third display unit displaying a third image, and a controlling unit to which the displaying unit is coupled, wherein the displaying unit includes a first display unit located at a left eye side of the user and displaying a first image overlapping an external scene, and a second display unit located at a right eye side of the user and displaying a second image corresponding to the first image overlapping and the external scene, the controlling unit includes a first detector detecting that at least one of the first image and the second image overlaps the third image, an adjustment unit adjusting, based on a detection result in the first detector, an image of at least one of the first image and the second image such that the third image is visible, and a display control unit causing, based on an adjustment result of the adjustment unit, the first display unit to display the first image and causing the second display unit to display the second image.

DESCRIPTION OF EXEMPLARY EMBODIMENTS

Exemplary embodiments are described below with reference to the accompanying drawings.

1. Configuration of Display System 1-1. Overall Configuration of Display System

Figure 1:
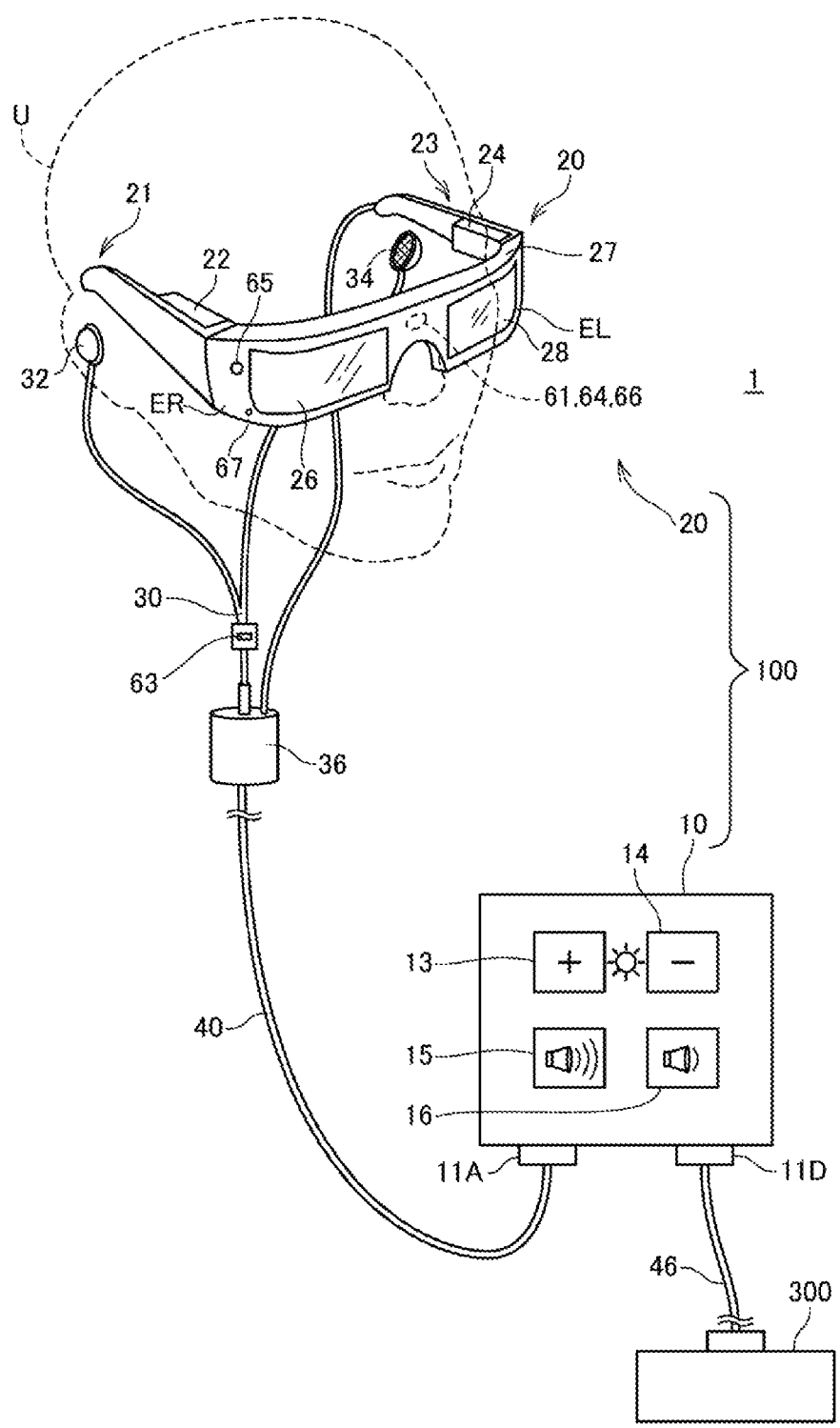
FIG. 1 is a diagram illustrating an example of a configuration of a display system according to the present exemplary embodiment.

FIG. 1 is a diagram illustrating a schematic configuration of a display system 1 according to the present exemplary embodiment.

As illustrated in FIG. 1, the display system 1 includes a Head Mounted Display (HMD) 100. The HMD 100 is a device including an image display unit 20 mounted on a head of a user U, and a connection device 10, and is a device for causing a virtual image to be visually recognized by the user U while mounted on the head of the user U, by the image display unit 20.

The HMD 100 corresponds to an example of a "display device". The image display unit 20 corresponds to an example of a "displaying unit". The connection device 10 corresponds to an example of a "controlling unit".

In the following description, the user U refers to a user who wears and uses the HMD 100.

The connection device 10 includes a conductive connector 11A and a conductive connector 11D in a box shaped case. The image display unit 20 is coupled to the conductive connector 11A via a coupling cable 40. Hereinafter, when the conductive connectors 11A and 11D are not distinguished, the conductive connectors are referred to as conductive connectors 11 in some cases. The case of the connection device 10 can be referred to as a housing or a main body.

The display system 1 is a system configured by coupling a smart phone 300 to the HMD 100. The conductive connector 11D is an interface to which the smart phone 300 in the HMD 100 is coupled. In other words, in the present exemplary embodiment, the smart phone 300 is coupled to the conductive connector 11D. The smart phone 300 corresponds to an example of an "information processing device".

Note that, the smart phone 300 is only an example of the information processing device. It is sufficient that the information processing device is portable by the user U, and includes a display unit that displays an image, and a computer. For example, as the information processing device, a PDA (Personal Digital Assistant) terminal, a tablet personal computer, or the like can be coupled to the connection device 10.

The conductive connectors 11 are wired interfaces to be coupled to a communication cable, and the connection device 10 is coupled to an external device via the communication cable. The conductive connector 11A includes a terminal configured to couple the coupling cable 40, and an interface circuit configured to transmit and receive a signal via the conductive connector 11A.

The conductive connector 11A is provided to couple the image display unit 20 to the connection device 10. The coupling cable 40 is configured to supply power from the connection device 10 to the image display unit 20, and the image display unit 20 and the connection device 10 transmit and receive data to and from each other.

The conductive connector 11D includes an interface circuit input with image data from the smart phone 300, and capable of outputting sensor data to the smart phone 300. The smart phone 300 replays content data recorded in a nonvolatile storage. The conductive connector 11D is a conductive connector conforming to a known communication interface standard.

In the present exemplary embodiment, as an example, the conductive connector 11D includes an interface circuit supporting input/output of image data and various types of data, and is coupled to a smart phone 300 via a USB cable 46.

For example, a conductive connector of a Universal Serial Bus (USB)-Type C standard can be adopted as the conductive connector 11D. An interface circuit supporting the USB-Type C is capable of transmitting data according to a USB 3.1 standard and supplying a direct-current power within 20 volts and 5 amperes.

Additionally, image data conforming to the High Definition Multimedia Interface (registered trade mark: HDMI) standard, image data conforming to a Mobile High-definition Link (MHL) standard, and the like can be transmitted. The smart phone 300 can provide power supply, transmission and reception of data, and supply of streaming data for images and audio via the USB cable 46. An alternative mode of USB-Type C is known as Alternative mode.

The image display unit 20 has an eyeglasses-like shape in the present exemplary embodiment. The image display unit 20 includes a main body including a right holding part 21, a left holding part 23, and a front frame 27. The main body further includes a right display unit 22, a left display unit 24, a right light-guiding plate 26, and a left light-guiding plate 28.

The right holding part 21 and the left holding part 23 extend rearward from corresponding ends of the front frame 27, to hold the image display unit 20 on the head of the user U. One of the ends of the front frame 27, which lies on the right side of the head when the image display unit 20 is worn, is referred to as an end ER, while the other one of the ends, which lies on the left side, is referred to as an end EL. The right holding part 21 extends from the end ER of the front frame 27 to a position corresponding to the right side of the head of the user U in a state where the user wears the image display unit 20. The left holding part 23 extends from the end EL to a position corresponding to the left side of the head of the user U in a state where the user U wears the image display unit 20.

The right light-guiding plate 26 and the left light-guiding plate 28 are provided on the front frame 27. The right light-guiding plate 26 is located in front of the right eye of the user U in a state where the user U wears the image display unit 20, and causes the user to visually recognize an image with the right eye. The left light-guiding plate 28 is located in front of the left eye of the user U in a state where the user U wears the image display unit 20, and causes the user to visually recognize an image with the left eye.

The front frame 27 has a shape formed by coupling an end of the right light-guiding plate 26 and an end of the left light-guiding plate 28 to each other, and this coupling position corresponds to a position between eyebrows of the user U in a state where the user U wears the image display unit 20.

The front frame 27 may include a nose pad provided in the coupling position of the right light-guiding plate 26 and the left light-guiding plate 28, and configured to abut on a nose of the user U in a state where the user U wears the image display unit 20. In this case, the image display unit 20 can be held to the head of the user U by the nose pad, the right holding part 21, and the left holding part 23. A belt may also be attached to the right holding part 21 and the left holding part 23 that fits to the back of the head of the user U when the user U wears the image display unit 20. In this case, the belt allows the image display unit 20 to be held on the head of the user U.

Each of the right display unit 22 and the left display unit 24 is a module obtained by unitizing an optical unit and a peripheral circuit.

The right display unit 22 is a unit related to display of an image by the right light-guiding plate 26, and is provided on the right holding part 21 and is located near the right side head part of the user U in the mounted state. The left display unit 24 is a unit related to image display by the left light-guiding plate 28, and is provided on the left holding part 23 and is located near the left side head part of the user U in the mounted state. Note that, the right display unit 22 and the left display unit 24 may be collectively and simply referred to as a "display driving unit".

The right light-guiding plate 26 and the left light-guiding plate 28 are optical parts formed of a light transmissive resin or the like, and are configured to guide imaging light output by the right display unit 22 and the left display unit 24 to the eyes of the user U. The right light-guiding plate 26 and the left light-guiding plate 28 are, for example, prisms.

The left display unit 24 and the left light-guiding plate 28 correspond to an example of a "first display unit". The right display unit 22 and the right light-guiding plate 26 correspond to an example of a "second display unit".

Imaging light guided by the right light-guiding plate 26 and outside light transmitted through the right light-guiding plate 26 are incident on the right eye of the user U. Similarly, the imaging light guided by the left light-guiding plate 28 and the outside light transmitted through the left light-guiding plate 28 are incident on the left eye.

The imaging light guided by the left light-guiding plate 28 corresponds to a first image P1. In other words, the left display unit 24 and the left light-guiding plate 28 overlap and display the first image P1 on the external scene. The imaging light guided by the right light-guiding plate 26 corresponds to a second image P2. In other words, the right display unit 22 and the right light-guiding plate 26 overlap and display the second image P2 on the external scene.

The second image P2 is an image corresponding to the first image P1. In the present exemplary embodiment, the second image P2 is, for example, an identical image to the first image P1.

The first image P1 and the second image P2 will be described in detail below with reference to FIG. 8 to FIG. 10.

An illuminance sensor 65 is arranged on the front frame 27 of the image display unit 20. The illuminance sensor 65 is configured to receive outside light coming from in front of the user U wearing the image display unit 20.

A first camera 61 is disposed on the front frame 27 of the image display unit 20. The first camera 61 is provided at a position that the outside light passing through the right light-guiding plate 26 and the left light-guiding plate 28 is not blocked. In the example illustrated in FIG. 1, the first camera 61 is disposed at a coupling portion between the right light-guiding plate 26 and the left light-guiding plate 28, but may also be disposed on a side of the end ER of the front frame 27, or may be disposed on a side of the end EL.

The first camera 61 corresponds to an example of a "first imaging unit".

The first camera 61 is a digital camera equipped with an imaging element, such as a charge coupled device (CCD) or a complementary metal oxide semiconductor (CMOS), and an imaging lens and the like. The first camera 61 captures the first imaging range of the external scene and generates a first captured image.

The first imaging range will be described below with reference to FIG. 6. The first camera 61 according to the exemplary embodiment is a monocular camera, but may be a stereo camera.

A Light Emitting Diode (LED) indicator 67 is disposed on the front frame 27. The LED indicator 67 is disposed at the end ER and is configured to light up while the first camera 61 is operating to notify that the capturing is in progress.

A distance sensor 64 and an infrared sensor 66 are provided on the front frame 27. The distance sensor 64 is configured to detect a distance to a target object to be measured located in a preset measurement direction. The distance sensor 64 may be a light reflecting type distance sensor including a light source, such as an LED or a laser diode, and a light-receiving unit configured to receive the reflected light that the light emitted by the light source is reflected by the target object to be measured, for example. Further, the distance sensor 64 may be an ultrasonic wave type distance sensor including a sound source configured to generate ultrasonic waves, and a detector configured to receive the ultrasonic waves reflected by the target object to be measured. The distance sensor 64 may be a laser range scanner. In this case, a wider region including an area in front of the image display unit 20 can be scanned.

The infrared sensor 66 detects an infrared ray. Specifically, the infrared sensor 66 detects an infrared ray exited from an infrared communication unit of the smart phone 300. Furthermore, the infrared sensor 66 may be configured as a part of the infrared communication unit. In this case, communication with the infrared communication unit of the smart phone 300 is possible. The infrared communication unit performs communication based on IrDA standards, for example.

Each of the right display unit 22 and the left display unit 24 of the image display unit 20 is coupled with the connection device 10. In the HMD 100, the coupling cable 40 is coupled with the left holding part 23, and wiring coupled with this coupling cable 40 is laid inside the image display unit 20 to couple each of the right display unit 22 and the left display unit 24 with the connection device 10.

The coupling cable 40 includes an audio connector 36, wherein a headset 30 including a right earphone 32 and a left earphone 34 constituting a stereo headphone, and a microphone 63, is coupled to the audio connector 36. The right earphone 32 is to be worn on a right ear of the user U, while the left earphone 34 is to be worn on a left ear of the user U. The right earphone 32 and the left earphone 34 can also be referred to as a sound output unit.

The right earphone 32 and the left earphone 34 output a sound based on a sound signal output from the connection device 10.

The microphone 63 is configured to collect a sound and outputs the sound signal to the connection device 10. The microphone 63 may be, for example, a monaural microphone or a stereo microphone, or may be a directional microphone or a non-directional microphone.

The connection device 10 includes a brightness adjusting key 13, a brightness adjusting key 14, a sound volume adjusting key 15, and a sound volume adjusting key 16 as operated parts to be operated by the user U. Each of the brightness adjustment key 13, the brightness adjustment key 14, the volume adjustment key 15, and the volume adjustment key 16 is composed of a hardware key. These operated parts are disposed on the surface of the main body of the connection device 10, and may be operated by fingers of the user U, for example.

The brightness adjustment keys 13, 14 are hardware keys for adjusting display luminance of an image displayed by the image display unit 20. The brightness adjusting key 13 is configured to instruct an increase in brightness, and the brightness adjusting key 14 is configured to instruct a reduction in brightness. The volume adjusting keys 15, 16 are hardware keys configured to adjust volume of sound output from the right earphone 32 and the left earphone 34. The volume adjusting key 15 is configured to instruct an increase in volume, and the sound volume adjusting key 16 is configured to instruct a reduction in volume.

1-2. Configuration of Optical System of Image Display Unit of HMD

Figure 2:
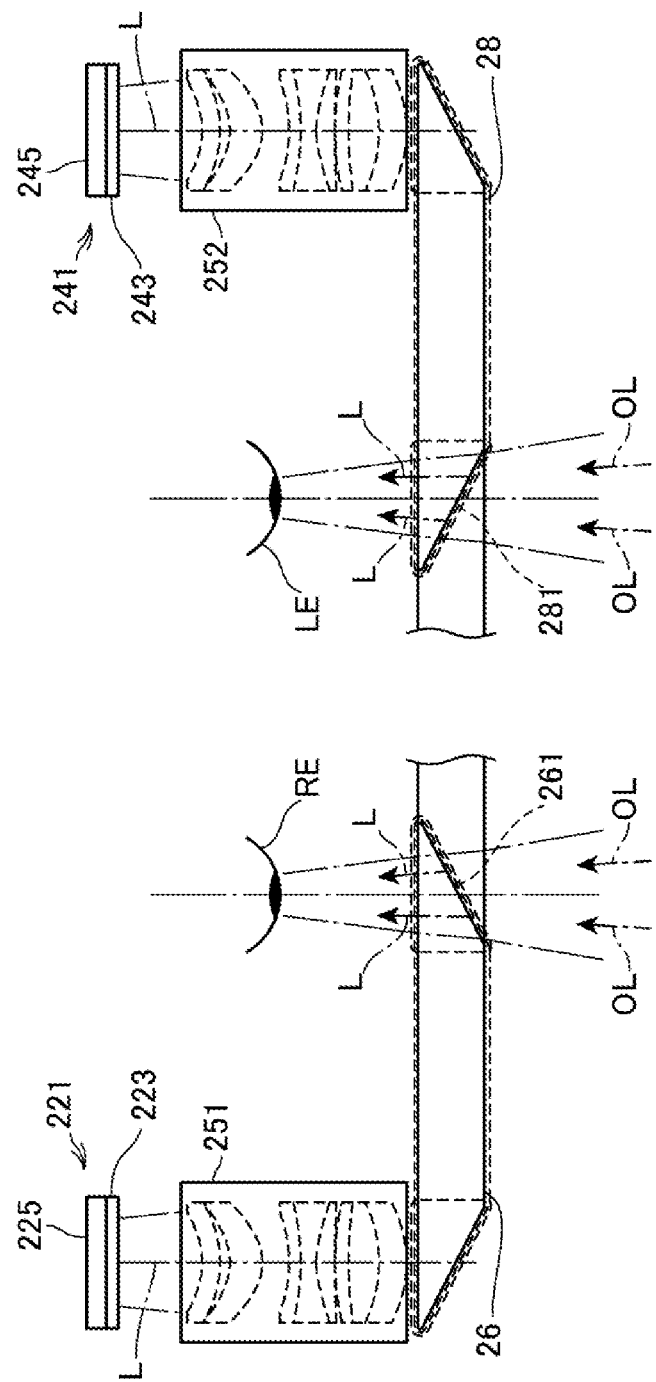
FIG. 2 is a diagram illustrating an example of a configuration of an optical system of an image display unit.

FIG. 2 is a plan view illustrating a main part of a configuration of an optical system included in the image display unit 20. In FIG. 2, a left eye LE and a right eye RE of the user U are illustrated for explanation.

As illustrated in FIG. 2, the right display unit 22 and the left display unit 24 are configured symmetrically. As a configuration where the right eye RE of the user U is caused to visually recognize an image, the right display unit 22 includes an Organic Light-Emitting Diode (OLED) unit 221 configured to emit imaging light. Additionally, the right display unit 22 includes a right optical system 251 including a lens group configured to guide imaging light L emitted by the OLED unit 221, and the like. The imaging light L is guided by the right optical system 251 to the right light-guiding plate 26.

The OLED unit 221 includes an OLED panel 223 and an OLED driving circuit 225 configured to drive the OLED panel 223. The OLED panel 223 is a self-light emission type display panel including light-emitting elements disposed in a matrix and configured to emit light by organic electroluminescence to emit red (R) color light, green (G) color light, and blue (B) color light respectively. The OLED panel 223 has, as one pixel, a unit including one R element, one G element, and one B element, and includes a plurality of the pixels, and the OLED panel 223 forms an image with the plurality of pixels disposed in a matrix. The OLED driving circuit 225 is controlled by a first control unit 120 to select and power the light-emitting elements included in the OLED panel 223 to cause the light-emitting elements of the OLED panel 223 to emit light. The first control unit 120 will be described below with reference to FIG. 4.

Figure 4:
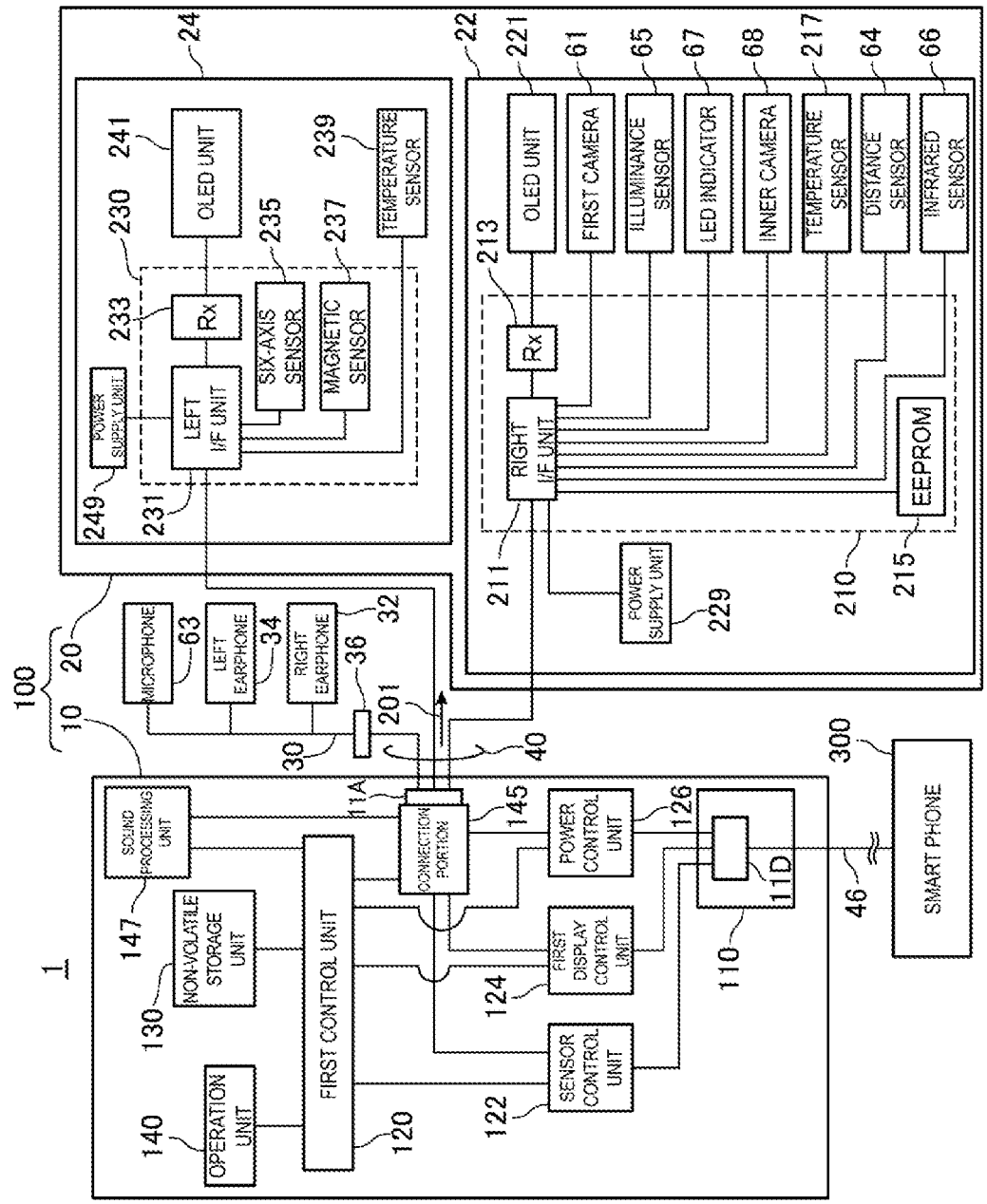
FIG. 4 is a diagram illustrating an example of a configuration of respective components configuring an HMD.

The OLED driving circuit 225 is fixed by bonding or the like to a rear face of the OLED panel 223, namely, a back side of a light-emitting surface of the OLED panel 223. The OLED driving circuit 225 may include, for example, a semiconductor device configured to drive the OLED panel 223, and may be mounted on a substrate (not illustrated) fixed to the rear face of the OLED panel 223. A temperature sensor 217 illustrated in FIG. 4 is mounted on this substrate.

Note that the OLED panel 223 may include a configuration in which light-emitting elements configured to emit white color light are disposed in a matrix, and color filters corresponding to the R color, the G color, and the B color respectively are disposed to be superimposed on the light-emitting elements. Additionally, the OLED panel 223 of a WRGB configuration including light-emitting elements configured to emit white (W) color light may be used, in addition to the light-emitting elements configured to emit the R color light, the G color light, and the B color light respectively.

The right optical system 251 includes a collimate lens configured to collimate the imaging light L emitted from the OLED panel 223. The imaging light L collimated by the collimate lens enters the right light-guiding plate 26. In an optical path configured to guide light inside the right light-guiding plate 26, a plurality of reflective faces configured to reflect the imaging light L are formed. The imaging light L is reflected multiple times inside the right light-guiding plate 26 and then, is guided to the right eye RE side. In the right light-guiding plate 26, a half mirror 261 (reflective face) located in front of the right eye RE is formed. The imaging light L is reflected by the half mirror 261 to be emitted from the right light-guiding plate 26 toward the right eye RE, and this imaging light L forms an image at a retina of the right eye RE, and causes the user U to visually recognize the second image P2.

Additionally, as a configuration in which the left eye LE of the user U is caused to visually recognize an image, the left display unit 24 includes an OLED unit 241 configured to emit imaging light, and a left optical system 252 including a lens group configured to guide the imaging light L emitted by the OLED unit 241, and the like. The imaging light L is guided by the left optical system 252 to the left light-guiding plate 28.

The OLED unit 241 includes an OLED panel 243, and an OLED driving circuit 245 configured to drive the OLED panel 243. The OLED panel 243 is a self-light emission type display panel configured in a manner similar to the OLED panel 223. The OLED driving circuit 245 is instructed by the first control unit 120 to select and power the light-emitting elements included in the OLED panel 243 to cause the light-emitting elements of the OLED panel 243 to emit light.

The OLED driving circuit 245 is fixed by bonding or the like to a rear face of the OLED panel 243, namely, a back side of a light-emitting surface of the OLED panel 243. The OLED driving circuit 245 may include, for example, a semiconductor device configured to drive the OLED panel 243, and may be mounted on a substrate (not illustrated) fixed to the rear face of the OLED panel 243. A temperature sensor 239 illustrated in FIG. 4 is mounted on this substrate.

The left optical system 252 includes a collimate lens configured to collimate the imaging light L emitted from the OLED panel 243. The imaging light L collimated by the collimate lens enters the left light-guiding plate 28. The left light-guiding plate 28 is an optical element in which a plurality of reflective faces configured to reflect the imaging light L are formed, and the left light-guiding plate 28 is, for example, a prism. The imaging light L is reflected multiple times inside the left light-guiding plate 28 and then, is guided to the left eye LE side. In the left light-guiding plate 28, a half mirror 281 (reflective face) located in front of the left eye LE is formed. The imaging light L is reflected by the half mirror 281 to be emitted from the left light-guiding plate 28 to the left eye LE, and this imaging light L forms an image on a retina at the left eye LE, and causes the user U to visually recognize the first image P1.

According to the configuration, the HMD 100 serves as a transmissive display device. Namely, the imaging light L reflected by the half mirror 261 and outside light OL having passed through the right light-guiding plate 26 enter the right eye RE of the user U. Additionally, the imaging light L reflected by the half mirror 281 and the outside light OL having passed through the half mirror 281 enter the left eye LE. As described above, the HMD 100 allows the imaging light L of the image processed internally and the outside light OL to enter the eyes of the user U in an overlapped manner, and the user U can see the external scene through the right light-guiding plate 26 and the left light-guiding plate 28, and can view the image based on the imaging light L overlapping with the external scene.

The half mirrors 261 and 281 are image extracting units configured to reflect the imaging light output by the right display unit 22 and the left display unit 24 respectively to extract images, and can be referred to as a display unit.

Note that the left optical system 252 and the left light-guiding plate 28 are collectively referred to as a "left light-guiding unit", and the right optical system 251 and the right light-guiding plate 26 are collectively referred to as a "right light-guiding unit". Configurations of the right light-guiding unit and the left light-guiding unit are not limited to the example described above, and can use any manner as long as imaging light is used to form a virtual image in front of the eyes of the user U. For example, a diffraction grating may be used, or a semi-transmissive reflection film may be used.

Figure 3:
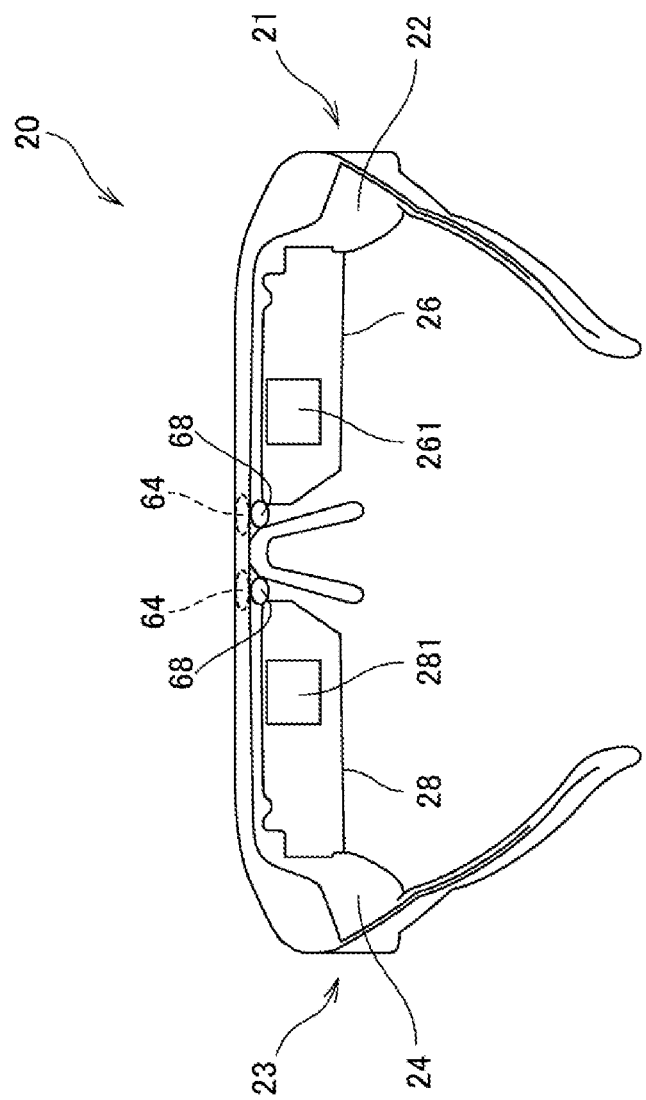
FIG. 3 is a perspective view illustrating an example of a configuration of a main part of the image display unit.

FIG. 3 is a diagram illustrating a configuration of a main part of the image display unit 20. FIG. 3 is a perspective view of the main part of the image display unit 20 seen from a head side of the user U. Note that, in FIG. 3, illustration of the coupling cable 40 is omitted.

FIG. 3 illustrates a side contacting the head of the user U of the image display unit 20, that is, a side seen from the right eye RE and the left eye LE of the user U. In other words, in FIG. 3, back sides of the right light-guiding plate 26 and the left light-guiding plate 28 are visible.

In FIG. 3, the half mirror 261 configured to irradiate the right eye RE of the user U with imaging light and the half mirror 281 configured to irradiate the left eye LE with imaging light are visible as approximately square-shaped regions. Additionally, all the right light-guiding plate 26 including the half mirror 261 and the left light-guiding plate 28 including the half mirror 281 transmit the outside light as described above. Thus, the user U visually recognizes an external scene through all the right light-guiding plate 26 and the left light-guiding plate 28, and visually recognizes rectangular display images at positions of the half mirrors 261 and 281.

Additionally, inner cameras 68 are disposed on the user U side of the image display unit 20. A pair of inner cameras 68 are provided in a central position between the right light-guiding plate 26 and the left light-guiding plate 28 so as to correspond respectively to the right eye RE and the left eye LE of the user U. The inner cameras 68 are a pair of cameras that respectively capture an image of the right eye RE and the left eye LE of the user U. The inner cameras 68 captures an image in accordance with instructions from the first control unit 120. The first control unit 120 analyzes the imaging data of the inner cameras 68. For example, the first control unit 120 detects an image of the reflected light and the pupil on the surface of the eyeball of the right eye RE and the left eye LE from the imaging data of the inner camera 68, and determines the sight line direction of the user U. The first control unit 120 may determine the change in the sight line direction of the user U and may detect the eyeball movement of each of the right eye RE and the left eye LE.

Here, the movement of the user U's line of sight can also be seen as movement of the user U's virtual viewpoint.

When detecting the sight line direction of the right eye RE and the left eye LE from the captured image of the inner camera(s) 68, the first control unit 120 can determine the convergence angle of the right eye RE and the left eye LE. The convergence angle corresponds to a distance to the object the user U fixates on. That is, when the user U sterically views an image and an object, the convergence angle of the right eye RE and the left eye LE is determined in accordance with the distance to the object to be viewed. Accordingly, the convergence angle can be detected to evaluate a distance from where the user U fixates on. Further, when an image is displayed so to guide the convergence angle of the user U, a stereoscopic view can be induced.

In addition, in accordance with an instruction from a second control unit 310, based on an adjustment result in an adjustment unit 315, the first control unit 120 causes the left display unit 24 and the left light-guiding plate 28 to display the first image P1, and causes the right display unit 22 and the right light-guiding plate 26 to display the second image P2. Specifically, the first control unit 120, in accordance with an instruction from the second control unit 310, causes the left display unit 24 and the left light-guiding plate 28 to display the first image P1 after being adjusted by the adjustment unit 315, and causes the right display unit 22 and the right light-guiding plate 26 to display the second image P2 after being adjusted by the adjustment unit 315.

1-3. Configuration of Respective Components of HMD

FIG. 4 is a diagram illustrating an example of a configuration of respective components configuring the HMD 100.

The right display unit 22 of the image display unit 20 includes a right display unit substrate 210. On the right display unit substrate 210, a right I/F unit 211 coupled to the coupling cable 40, a reception unit 213 that receives data input from the connection device 10 via the right I/F unit 211, and an Electrically Erasable Programmable Read Only Memory (EEPROM) 215 are mounted. The right I/F unit 211 couples the reception unit 213, the EEPROM 215, the temperature sensor 217, the first camera 61, the distance sensor 64, the illuminance sensor 65, the infrared sensor 66, the LED indicator 67, and the inner camera 68 to the connection device 10. The reception unit 213 couples the OLED unit 221 to the connection device 10.

The left display unit 24 includes a left display unit substrate 230. On the left display unit substrate 230, a left I/F unit 231 coupled to the coupling cable 40, a reception unit 233 that receives data input from the connection device 10 via the left I/F unit 231 are mounted. Further, the left display unit substrate 230 is mounted with a six-axis sensor 235 and a magnetic sensor 237.

The left I/F unit 231 couples the reception unit 233, the six-axis sensor 235, the magnetic sensor 237, and the temperature sensor 239 to the connection device 10. The reception unit 233 couples an OLED unit 241 to the connection device 10.

I/F is an abbreviation for interface. Note that, in the present exemplary embodiment, the reception unit 213 and the reception unit 233 may be referred to as Rx213 and Rx233, respectively.

The EEPROM 215 is configured to store various types of data in a non-volatile manner. The EEPROM 215 stores, for example, data about light-emitting properties and display properties of the OLED units 221 and 241 provided in the image display unit 20, and data about a property of a sensor provided in the right display unit 22 or the left display unit 24.

Specifically, the EEPROM 215 stores parameters regarding gamma correction of the OLED units 221 and 241, data used to compensate for detection values of the temperature sensors 217 and 239, and the like. These kinds of data are generated by inspection at the time of factory shipment of the HMD 100, and are written into the EEPROM 215. The data stored in the EEPROM 215 can be read by the first control unit 120.

The first camera 61 captures an image in accordance with a signal input via the right I/F unit 211 and outputs imaging data to the right I/F unit 211.

The illuminance sensor 65 is configured to receive the outside light and output a detection value corresponding to an amount of the received light or an intensity of the received light. The LED indicator 67 is configured to light up in accordance with a control signal or a driving current input via the right I/F unit 211.

The inner camera 68 captures an image in accordance with a signal input via the right I/F unit 211 and outputs imaging data to the right I/F unit 211.

The temperature sensor 217 is configured to detect a temperature of the OLED unit 221, and outputs a voltage value or a resistance value corresponding to the detected temperature as a detection value.

The distance sensor 64 is configured to execute distance detection, and output a signal indicating detection results to the connection device 10 via the right I/F unit 211. As the distance sensor 64, for example, an infrared ray type depth sensor, an ultrasonic type distance sensor, a Time Of Flight distance sensor, a distance detecting unit configured to combine image detection and sound detection, or the like can be used. Additionally, the distance sensor 64 may be configured to process an image obtained by stereo photographing by a stereo camera or a monocular camera to detect a distance.

The infrared sensor 66 is configured to execute infrared detection, and output a signal indicating detection results to the connection device 10 via the right I/F unit 211.

The reception unit 213 is configured to receive image data for displaying transmitted from the connection device 10 via the right I/F unit 211, and output the image data to the OLED unit 221. The OLED unit 221 displays an image based on the image data transmitted by the connection device 10.

The reception unit 233 is configured to receive image data for displaying transmitted from the connection device 10 via the left I/F unit 231, and output the image data to the OLED unit 241. The OLED unit 221, 241 display an image based on the image data transmitted by the connection device 10.

The six-axis sensor 235 is a motion sensor including a three-axis acceleration sensor and a three-axis gyro sensor. As the six-axis sensor 235, an Inertial Measurement Unit (IMU) including the above-described sensors as modules may be adopted. The magnetic sensor 237 is a three-axis geomagnetic sensor, for example. A gyro sensor is also referred to as an angular velocity sensor.

The temperature sensor 239 is configured to detect a temperature of the OLED unit 241, and output a voltage value or a resistance value corresponding to the detected temperature as a detection value.

Each component of the image display unit 20 operates with power supplied from the connection device 10 via the coupling cable 40.

The image display unit 20 includes a power supply unit 229 on the right display unit 22, and a power supply unit 249 on the left display unit 24. The power supply unit 229 is configured to distribute and supply the power supplied by the connection device 10 via the coupling cable 40 to each part of the right display unit 22 including the right display unit substrate 210. Similarly, the power supply unit 249 is configured to distribute and supply the power supplied by the connection device 10 via the coupling cable 40 to each part of the left display unit 24 including the left display unit substrate 230. The right display unit 22 and the left display unit 24 may include a conversion circuit or the like configured to convert a voltage.

The connection device 10 includes an I/F unit 110, the first control unit 120, a sensor control unit 122, a first display control unit 124, a power control unit 126, a non-volatile storage unit 130, an operation unit 140, a connection portion 145, and a sound processing unit 147.

The I/F unit 110 includes the conductive connector 11D. Further, the I/F unit 110 includes interface circuits coupled to the conductive connector 11D and configured to execute communication protocols conforming to respective communication standards.

The I/F unit 110 may be, for example, an interface substrate on which the conductive connector 11D and the interface circuit are mounted. Further, a configuration may be adopted in which the first control unit 120, the sensor control unit 122, the first display control unit 124, and the power control unit 126 of the connection device 10 are mounted on a connection device main substrate (not illustrated). In this case, on the connection device main substrate, the conductive connector 11D of the I/F unit 110 and the interface circuit may be mounted.

Additionally, the I/F unit 110 may include, for example, an interface circuit for a memory card capable of being coupled to an external storage medium, or the like, or the I/F unit 110 may be configured by a wireless communication interface circuit.

The first control unit 120 is configured to control each part of the connection device 10. The first control unit 120 includes a first processor such as a Central Processing Unit (CPU), for example. In the first control unit 120, the first processor executes a first control program to control each component of the HMD 100 in cooperation of software and hardware. The first control unit 120 is coupled to the non-volatile storage unit 130, the operation unit 140, the connection portion 145, and the sound processing unit 147.

The sensor control unit 122 is configured to control the first camera 61, the distance sensor 64, the illuminance sensor 65, the infrared sensor 66, the temperature sensor 217, the six-axis sensor 235, the magnetic sensor 237, and the temperature sensor 239. Specifically, the sensor control unit 122 is configured to perform setting and initialization of a sampling period of each sensor according to control of the first control unit 120, and execute energization to each sensor, transmission of control data, acquisition of detection values and the like, in correspondence to the sampling period of each sensor.

The sensor control unit 122 is coupled to the conductive connector 11D of the I/F unit 110, and is configured to output the data regarding the detection value acquired from each sensor to the conductive connector 11D at a preset timing. The smart phone 300 coupled to the conductive connector 11D can acquire the detection value of each sensor of the HMD 100, the imaging data of the first camera 61, and data indicating a line-of-sight direction detected by the inner camera 68.

The first display control unit 124 is configured to execute various kinds of processing for the image display unit 20 to display an image based on image data input to the I/F unit 110. In the present exemplary embodiment, an image signal output by the smart phone 300 is input to the conductive connector 11D. The image signal is digital image data, but may be an analog image signal.

For example, the first display control unit 124 is configured to execute various kinds of processing such as cutting out of a frame, resolution conversion, intermediate frame generation, and frame rate conversion. Resolution conversion includes so-called scaling. The first display control unit 124 is configured to output image data corresponding to each of the OLED unit 221, and the OLED unit 241 to the connection portion 145. The image data input to the connection portion 145 is transmitted from the conductive connector 11A to the right I/F unit 211 and the left I/F unit 231 as an image signal 201. The image signal 201 is digital image data processed in response to each of the OLED unit 221 and the OLED unit 241.

In the present exemplary embodiment, the conductive connector 11D is configured by a USB-Type C conductive connector. The first display control unit 124 receives image data transmitted in USB-Type C alternative mode via the conductive connector 11D.

The sensor control unit 122 and/or the first display control unit 124 may be realized by cooperation of software and hardware by the first processor executing a program. That is, the sensor control unit 122 and the first display control unit 124 are configured by the first processor to execute a program to execute the operations described above. In this example, the sensor control unit 122 and the first display control unit 124 may be realized by the first processor constituting the first control unit 120 executing a program. In other words, the first processor may function as the first control unit 120, the first display control unit 124 and the sensor control unit 122 by executing the program.

Additionally, each of the first display control unit 124 and the sensor control unit 122 may include programmed hardware such as a Digital Signal Processor (DSP) and a Field Programmable Gate Array (FPGA). Additionally, the sensor control unit 122 and the first display control unit 124 may be integrated to be constituted as a System-on-a-Chip (SoC)-FPGA.

The power control unit 126 is coupled to the conductive connector 11D. The power control unit 126 is configured to, based on power supplied from the conductive connector 11D, supply power to each component of the connecting device 10 and to the image display unit 20. Additionally, the power control unit 126 may include a voltage conversion circuit (not illustrated) built in, and may be configured to be capable of supplying different voltage to each component of the connection device 10 and the image display unit 20. The power control unit 126 may be configured of a programmed semiconductor device such as a logic circuit and the FPGA. Further, the power control unit 126 may be configured of hardware common to the sensor control unit 122 and/or the first display control unit 124.

Each of the sensor control unit 122, the first display control unit 124, and the power control unit 126 may include a work memory for executing data processing, and may execute processing by using the memory of the first control unit 120.

The operation unit 140 is configured to detect an operation on an operated part included in the connection device 10 and outputs data indicating an operation content or an operation signal indicating the part to be operated to the first control unit 120.

The sound processing unit 147 is configured to generate a sound signal according to sound data that is input from the first control unit 120, and output the sound signal to the connection portion 145. This sound signal is output from the connection portion 145 to the right earphone 32 and the left earphone 34 via the audio connector 36. Additionally, the sound processing unit 147 is configured to adjust the volume of the sound signal under the control of the first control unit 120. Additionally, the sound processing unit 147 is configured to generate sound data of the sound collected by the microphone 63, and output the sound data to the first control unit 120. This voice data may be processed in the same manner as the detected value of the sensor included in the image display unit 20 by the first control unit 120.

Additionally, the connection device 10 may include a rechargeable battery (not illustrated), and may be configured to supply power to each component of the connection device 10 and the image display unit 20 from this battery. The battery included in the connection device 10 may be a rechargeable secondary battery.

1-4. Configuration of Smart Phone

Figure 5:
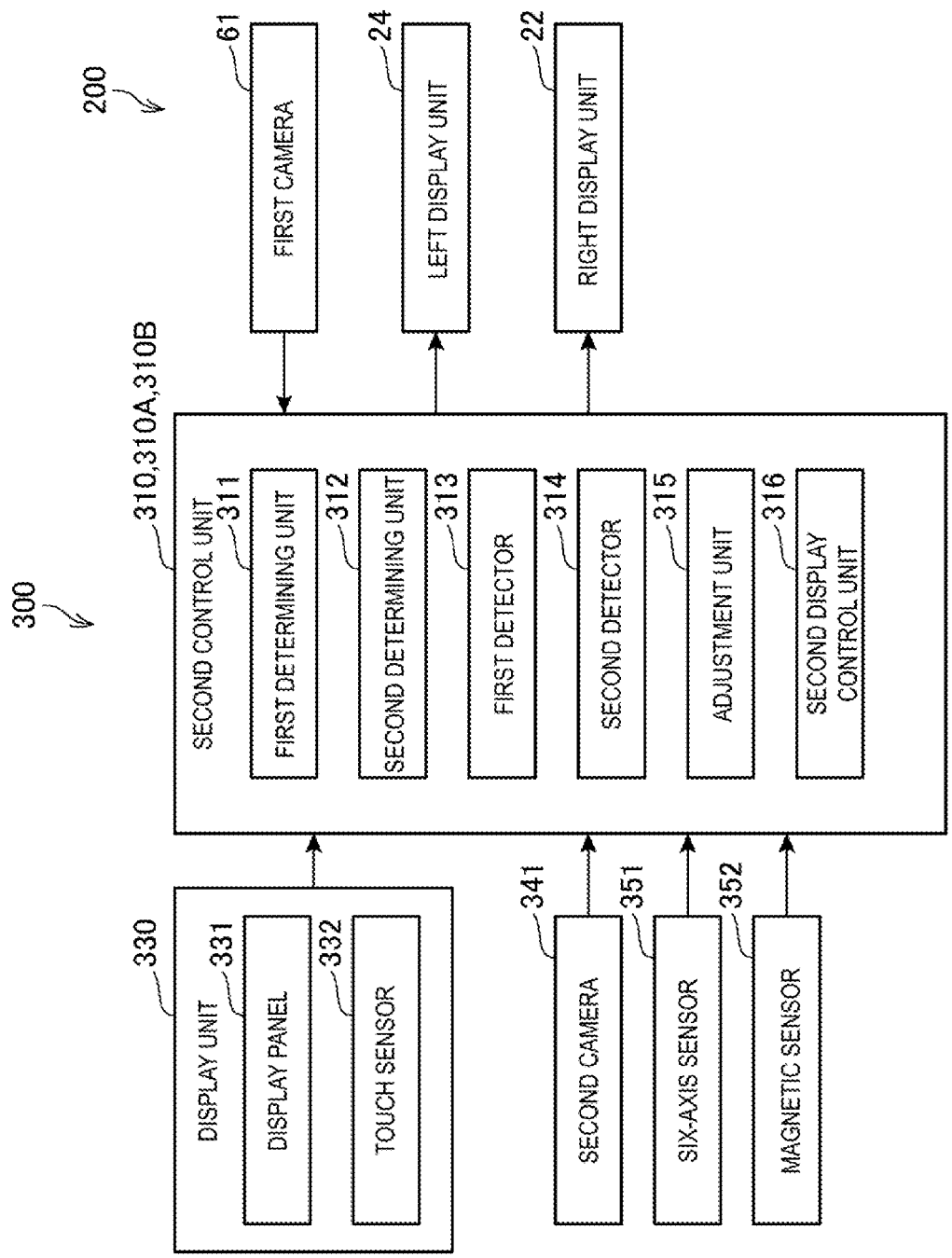
FIG. 5 is a diagram illustrating an example of a configuration of a smart phone.

FIG. 5 is a diagram illustrating an example of a configuration of the smart phone 300.

The smart phone 300 includes the second control unit 310, a display unit 330, a second camera 341, a six-axis sensor 351, and a magnetic sensor 352.

The second control unit 310 includes a second processor 310A such as a CPU or a microcomputer, and this second processor 310A is configured to execute a second control program to control each component of the smart phone 300. The second control unit 310 includes a read only memory (ROM) configured to store in a non-volatile manner the second control program executed by the second processor 310A and a second memory 310B such as a random access memory (RAM) constituting a work area of the second processor 310A.

The second processor 310A corresponds to an example of a "computer". The second control program stored in the second memory 310B of the second control unit 310 corresponds to an example of a "control program".

The second memory 310B may also include, for example, a magnetic recording device such as a Hard Disk Drive (HDD), or a storage device using a semiconductor storage element such as a flash memory.

A display panel 331, and a touch sensor 332 provided in the display unit 330 are coupled with the second control unit 310. The display panel 331 is configured to display various images based on control of the second control unit 310. The display panel 331 is constituted of a Liquid Crystal Display (LCD), for example. The display panel 331 is configured in a rectangular shape. In the present exemplary embodiment, the display panel 331 has a rectangular shape. The display panel 331 displays a third image P3.

The display panel 331 corresponds to an example of a "third display unit". The third image P3 will be described in detail below with reference to FIG. 8 to FIG. 10.

The touch sensor 332 is configured to detect a touch operation and output data indicating the detected operation to the second control unit 310.

The touch sensor 332 is integrally formed with the display panel 331. Specifically, the touch sensor 332 is formed at an image display surface of the display panel 331. In the present exemplary embodiment, the touch sensor 332 has a rectangular shape. The data output by the touch sensor 332 is coordinate data indicating an operating position in the touch sensor 332, or the like.

Figure 7:
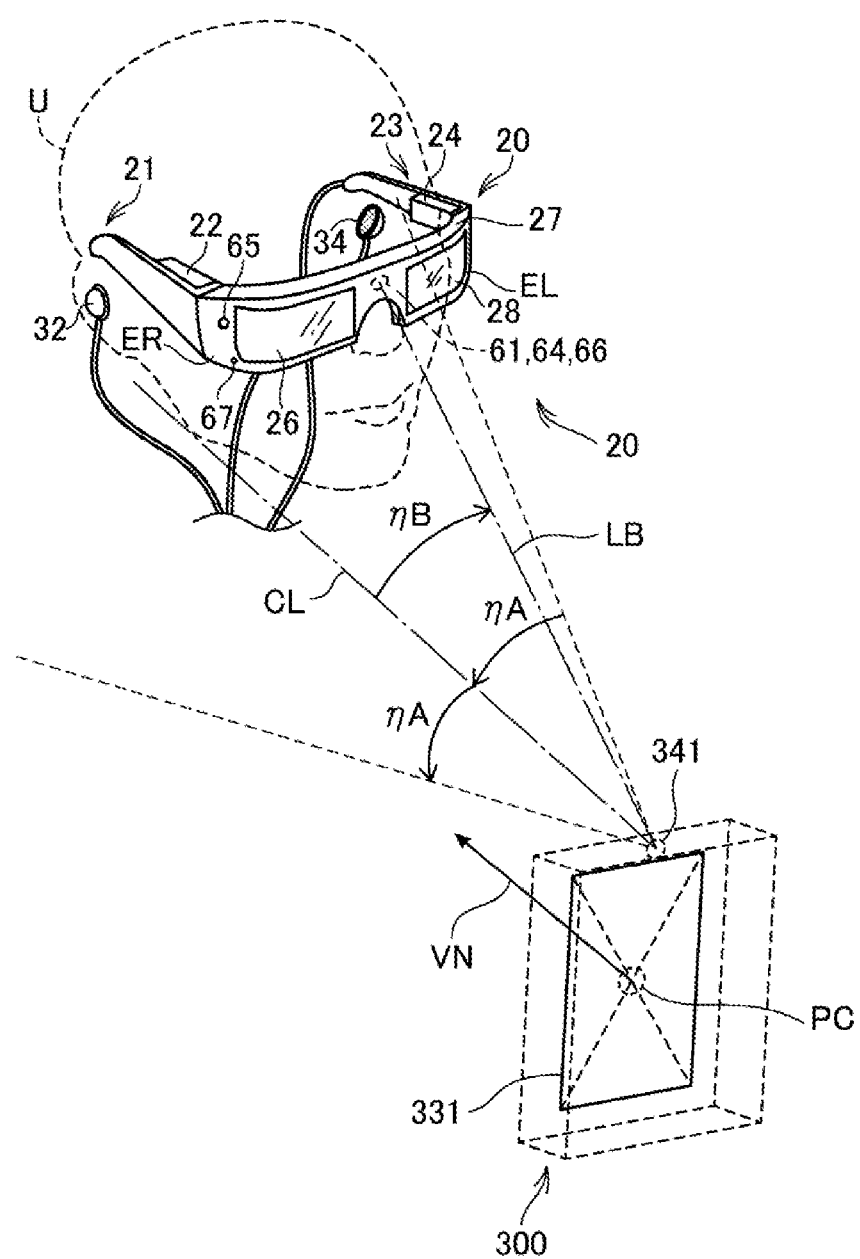
FIG. 7 is a diagram illustrating another example of the state in which the display panel faces the HMD.

The second camera 341 is a digital camera including an imaging element such as a CCD and a CMOS and an imaging lens. The second camera 341 captures a second imaging range of the external scene in accordance with an instruction from the second control unit 310, and generates the second captured image. As illustrated in FIG. 7, the second camera 341 is disposed on a surface on the same side of the smart phone 300 as the display panel 331. Specifically, the second camera 341 is disposed between a short side of the display panel 331, and a periphery of a surface of a housing that configures the smart phone 300 on which the display panel 331 is disposed.

The second camera 341 corresponds to an example of a "second imaging unit".

The second imaging range will be described below with reference to FIG. 7.

The six-axis sensor 351 is a motion sensor including a three-axis acceleration sensor and a three-axis gyro sensor. The six-axis sensor 351 may adopt an IMU in which the sensors described above are provided as a module. The magnetic sensor 352 is a three-axis geomagnetic sensor, for example. A gyro sensor is also referred to as an angular velocity sensor.

1-5. Configuration of Second Control Unit of Smart Phone

The second control unit 310 includes a first determining unit 311, a second determining unit 312, a first detector 313, a second detector 314, the adjustment unit 315, and a second display control unit 316. Specifically, the second control unit 310 functions as the first determining unit 311, the second determining unit 312, the first detector 313, the second detector 314, the adjustment unit 315, and the second display control unit 316, by the second processor 310A included in the second control unit 310 executing the second control program.

Based on an imaging result of the first camera 61, the first determining unit 311 determines whether the smart phone 300 is grasped by a left hand of the user U or is grasped by a right hand of the user U. Specifically, the first determining unit 311 determines, by performing image processing or the like on the first captured image of the first camera 61, whether the smart phone 300 is grasped by the left hand of the user U or is grasped by the right hand of the user U.

For example, when the user U grasps the smart phone 300 with the left hand, the first captured image of the first camera 61 includes an image corresponding to a part of a palm of the left hand of the user U, a thumb of the left hand of the user U, and respective tips of a middle finger, ring finger and pinky finger of the left hand of the user U. Further, for example, when the user U grasps the smart phone 300 with the right hand, the first captured image of the first camera 61 includes an image corresponding to a part of a palm of the right hand of the user U, a thumb of the right hand of the user U, and respective tips of a middle finger, ring finger and pinky finger of the right hand of the user U.

Thus, the first determining unit 311 determines, when a part of the left hand of the user U grasping the smart phone 300 is included in the first captured image of the first camera 61, that the smart phone 300 is grasped by the left hand of the user U. Additionally, the first determining unit 311 determines, when a part of the right hand of the user U grasping the smart phone 300 is included in the first captured image of the first camera 61, that the smart phone 300 is grasped by the right hand of the user U.

The second determining unit 312 determines whether the display panel 331 faces the HMD 100 illustrated in FIG. 1 or not. Specifically, the second determining unit 312 determines, based on the image captured by the first camera 61 illustrated in FIG. 1 and FIG. 4 and an image captured by the second camera 341, whether the display panel 331 of the smart phone 300 faces the HMD 100 or not. More specifically, when the following first condition and second condition are satisfied, it is determined that the display panel 331 faces the HMD 100.

First condition: the display panel 331 is located within the first imaging range of the first camera 61.

Second condition: the HMD 100 is located within the second imaging range of the second camera 341.

The first condition will be described in detail below with reference to FIG. 6. The second condition will be described in detail below with reference to FIG. 7.

The first detector 313 detects that at least one of the first image P1 and the second image P2 overlaps with the third image P3. Specifically, the first detector 313, based on the imaging result of the first camera 61, detects that at least one of the first image P1 and the second image P2 overlaps with the third image P3.

More specifically, the first detector 313, based on a position of the display panel 331 of the smart phone 300 included in the first captured image of the first camera 61, and an orientation of the right light-guiding plate 26 and the left light-guiding plate 28, detects that at least one of the first image P1 and the second image P2 overlaps with the third image P3.

For example, the first detector 313 detects that the first image P1 overlaps with the third image P3, and the second image P2 does not overlap with the third image P3. In addition, for example, the first detector 313 detects that the first image P1 does not overlap with the third image P3, and that the second image P2 overlaps with the third image P3. In addition, for example, the first detector 313 detects that the first image P1 overlaps with the third image P3, and that the second image P2 overlaps with the third image P3.

The first detector 313 corresponds to an example of a "detector".

The processing of the first detector 313 will be described in detail below with reference to FIG. 8 to FIG. 10.

When the first detector 313 detects that the first image P1 overlaps with the third image P3, the second detector 314 detects a first overlapping region AD1. The first overlapping region AD1 indicates a region in which the first image P1 overlaps with the third image P3. Further, when the first detector 313 detects that the second image P2 overlaps with the third image P3, the second detector 314 detects a second overlapping region AD2. The second overlapping region AD2 indicates a region in which the second image P2 overlaps with the third image P3.

Specifically, the second detector 314, based on the position of the display panel 331 of the smart phone 300 included in the first captured image of the first camera 61, and the orientation of the right light-guiding plate 26 and the left light-guiding plate 28, detects the first overlapping region AD1 and the second overlapping region AD2.

Each of the first overlapping region AD1 and the second overlapping region AD2 will be described in detail below with reference to FIG. 8 to FIG. 10.

The adjustment unit 315, based on a detection result of the first detector 313, in order for the user U to be able to visually recognize the third image P3, adjusts the image of at least one of the first image P1 and the second image P2. Further, the adjustment unit 315, in order for the second image P2 to be different from the first image P1, adjusts the image of at least one of the first image P1 and the second image P2.

Specifically, when the first detector 313 detects that the first image P1 overlaps with the third image P3, the adjustment unit 315 adjusts the first image P1, and when the first detector 313 detects that the second image P2 overlaps with the third image P3, adjusts the second image P2.

In the present exemplary embodiment, the adjustment unit 315, based on a detection result of the second detector 314, adjusts the image of at least one of the first image P1 and the second image P2. Specifically, when the first detector 313 detects that the first image P1 overlaps with the third image P3, the adjustment unit 315 prohibits display of the first overlapping region AD1 in the first image P1. Further, when the first detector 313 detects that the second image P2 overlaps with the third image P3, display of the second overlapping region AD2 in the second image P2 is prohibited.

Processing of the adjustment unit 315 will be described in detail below with reference to FIG. 8 to FIG. 10.

The second display control unit 316, for example, replays content data, and displays the third image P3 corresponding to image data included in the content data on the display panel 331 of the display unit 330. The second display control unit 316 transmits the first image P1 and the second image P2 corresponding to the third image P3 to the first control unit 120 of the HMD 100. Specifically, the second display control unit 316 transmits, based on the image data included in the content data, the first image P1 to be displayed on the left display unit 24 and the left light-guiding plate 28, and the second image P2 to be displayed on the right display unit 22 and the right light-guiding plate 26, to the first control unit 120 of the HMD 100.

In addition, based on an adjustment result in the adjustment unit 315, the second display control unit 316 causes the left display unit 24 and the left light-guiding plate 28 to display the first image P1, and causes the right display unit 22 and the right light-guiding plate 26 to display the second image P2. In other words, the second display control unit 316 causes the left display unit 24 and the left light-guiding plate 28 to display the first image P1 after being adjusted by the adjustment unit 315, and causes the right display unit 22 and the right light-guiding plate 26 to display the second image P2 after being adjusted by the adjustment unit 315.

The second display control unit 316 corresponds to an example of a "display control unit".

Processing of the second control unit 310 will be specifically described below with reference to FIG. 11.

In the present exemplary embodiment, when the first image P1 overlaps with the third image P3, the adjustment unit 315 prohibits the display of the first overlapping region AD1, and when the second image P2 overlaps with the third image P3, prohibits the display of the second overlapping region AD2, but the present exemplary embodiment of the present disclosure is not limited thereto. It is sufficient that, when the first image P1 overlaps with the third image P3, the adjustment unit 315 adjusts the first image P1 and, when the second image P2 overlaps with the third image P3, the adjustment unit 315 adjusts the second image P2.

For example, when the first image P1 overlaps with the third image P3, the adjustment unit 315 may prohibit the display of the first image P1, and when the second image P2 overlaps with the third image P3, the adjustment unit 315 may prohibit the display of the second image P2.

Further, for example, when the first image P1 overlaps with the third image P3, the adjustment unit 315 may adjust transmittance of the first image P1 and, when the second image P2 overlaps with the third image P3, the adjustment unit 315 may adjust transmittance of the second image P2. Note that, the adjustment unit 315 performs the adjustment such that each of the transmittance of the first image P1 and the transmittance of the second image P2 increases. The adjustment unit 315 performs the adjustment such that each of the transmittance of the first image P1 and the transmittance of the second image P2 increases from 10% to 50%, for example.

Further, for example, when the first image P1 overlaps with the third image P3, the adjustment unit 315 may adjust transmittance of the first overlapping region AD1 and, when the second image P2 overlaps with the third image P3, the adjustment unit 315 may adjust transmittance of the second overlapping region AD2. Note that, the adjustment unit 315 performs the adjustment such that each of the transmittance of the first overlapping region AD1 and the transmittance of the second overlapping region AD2 increases. For example, the adjustment unit 315 performs adjustment such that each of the transmittance of the first overlapping region AD1 and the transmittance of the second overlapping region AD2 increases from 10% to 50%.

In the present exemplary embodiment, the adjustment unit 315, based on the detection result of the first detector 313, and the detection result of the second detector 314, in order for the user U to be able to visually recognize the third image P3, adjusts the image of at least one of the first image P1 and the second image P2, but the exemplary embodiment of the present disclosure is not limited thereto. For example, the adjustment unit 315, based on a determination result of the first determining unit 311, may adjust the image of at least one of the first image P1 and the second image P2.

Specifically, when the first determining unit 311 determines that the smart phone 300 is grasped by the left hand of the user U, the adjustment unit 315 may prohibit the display of the first image P1 and, when the first determining unit 311 determines that the smart phone 300 is grasped by the right hand of the user U, the adjustment unit 315 may prohibit the display of the second image P2.

In the present exemplary embodiment, the second control unit 310 of the smart phone 300 includes the first determining unit 311, the second determining unit 312, the first detector 313, the second detector 314, the adjustment unit 315, and the second display control unit 316, but the exemplary embodiment of the present disclosure is not limited thereto. For example, the first control unit 120 of the connection device 10 of the HMD 100 may also include the first determining unit 311, the second determining unit 312, the first detector 313, the second detector 314, the adjustment unit 315, and the second display control unit 316. In the following description, an embodiment is described as "other exemplary embodiment of the present disclosure" in some cases in which the first control unit 120 of the connection device 10 of the HMD 100 includes the first determining unit 311, the second determining unit 312, the first detector 313, the second detector 314, the adjustment unit 315, and the second display control unit 316.

Further, for example, the second control unit 310 of the smart phone 300 may include some of the first determining unit 311, the second determining unit 312, the first detector 313, the second detector 314, the adjustment unit 315, and the second display control unit 316, and the first control unit 120 of the connection device 10 of the HMD 100 may include the rest of the first determining unit 311, the second determining unit 312, the first detector 313, the second detector 314, the adjustment unit 315, and the second display control unit 316.

2. Description of Processing of Second Control Unit of Smart Phone Using Specific Example Each of FIG. 6 to FIG. 10 is a diagram illustrating a specific example of processing of the second control unit 310.

2-1. Description of Processing of Second Determining Unit

Figure 6:
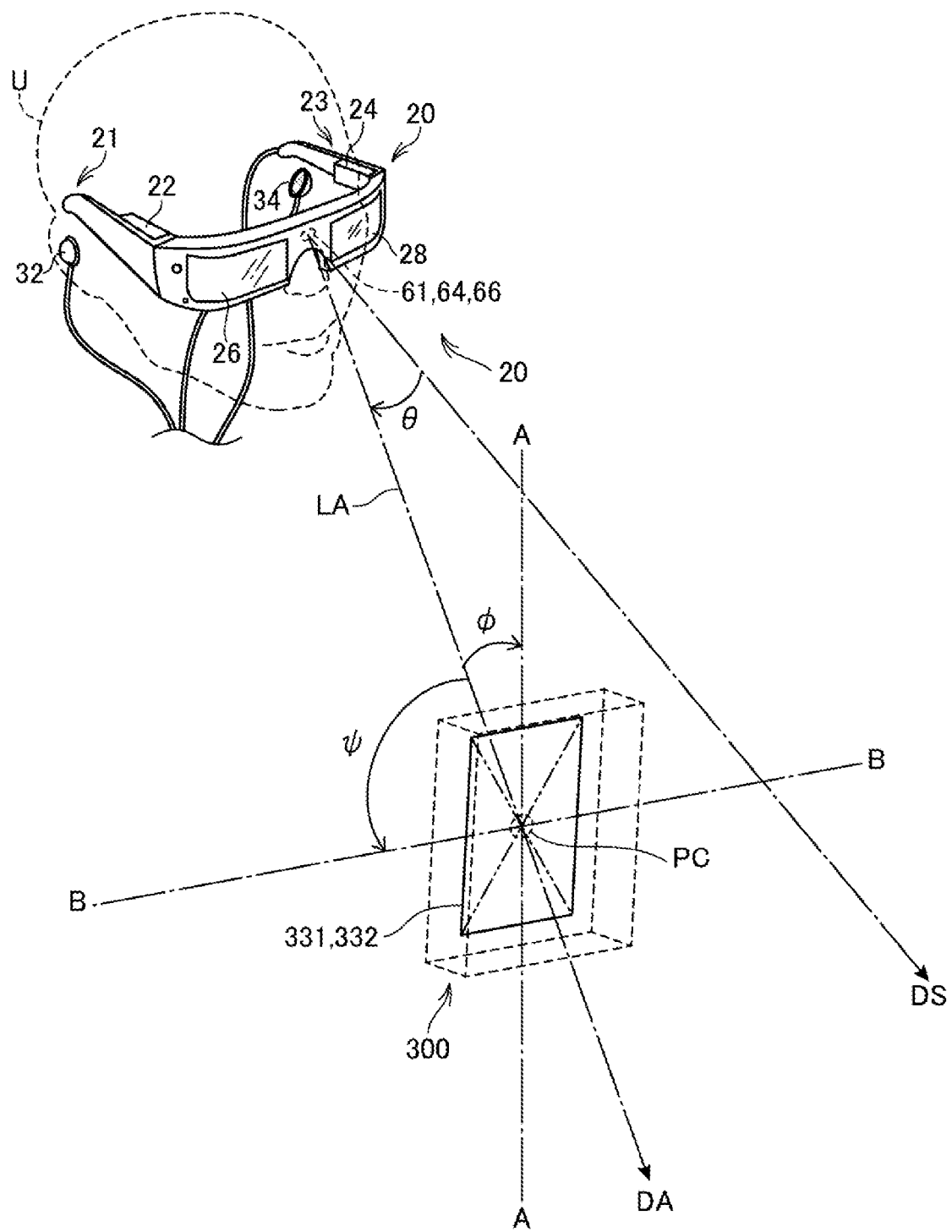
FIG. 6 is a diagram illustrating an example of a state in which a display panel faces the HMD.

FIG. 6 is a diagram illustrating an example of a state in which the display panel 331 faces the HMD 100. As illustrated in FIG. 6, when the user U operates the smart phone 300, the smart phone 300 is typically disposed in a direction DS opposite to the HMD 100. The direction DS indicates, for example, a direction orthogonal to a plane including the left light-guiding plate 28 and the right light-guiding plate 26. The direction DS is detected by the second control unit 310 based on the first captured image captured by the first camera 61.

A direction DA indicates a direction from the HMD 100 toward a central position PC of the display panel 331 of the smart phone 300. The direction DA is, based on the first captured image captured by the first camera 61, detected by the second determining unit 312.

The direction DA is inclined with respect to the direction DS by an inclination angle θ. The inclination angle θ indicates the inclination angle of the direction DA with respect to the direction DS.

When an absolute value of the tilt angle θ is equal to or less than a threshold angle θS, the second determining unit 312 determines that the display panel 331 is located within the first imaging range of the first camera 61. In other words, the second determining unit 312, when the inclination angle θ is equal to or less than the threshold angle θS, determines that the first condition is satisfied. The threshold angle θS is, for example, 30 degrees.

In this way, the second determining unit 312 can determine, based on the first captured image of the first camera 61, whether the first condition is satisfied or not.

A line A-A indicates a long side direction of the display panel 331. A line B-B indicates a short side direction of the display panel 331.

The line A-A is inclined with respect to the direction DA by an inclination angle cp. The inclination angle φ indicates the inclination angle of the A-A line with respect to the direction DA. Also, the line B-B is inclined with respect to the direction DA by an inclination angle ψ. The inclination angle ψ indicates the inclination angle of the B-B line with respect to the direction DA.

The inclination angle φ and the inclination angle ψ, when the user U visually recognizes the third image P3 displayed on the display panel 331, define an inclination of a display surface of the display panel 331 with respect to the user U or the HMD 100.

Further, for example, when each of the inclination angle φ and the inclination angle ψ is 90 degrees, the display surface of the display panel 331 is orthogonal to the direction DA.

In the present exemplary embodiment, when the first condition and the second condition are satisfied, the second determining unit 312 determines that the display panel 331 faces the HMD 100, but the exemplary embodiment of the present disclosure is not limited thereto. When the first condition and the second condition are satisfied, and each of the inclination angle φ and the inclination angle ψ is within a predetermined range, the second determining unit 312 may determine that the display panel 331 faces the HMD 100. The predetermined range is, for example, 90 degrees±30 degrees. That is, a fact that the inclination angle φ and the inclination angle ψ falling within the predetermined range means that Equation (1) and Equation (2) below are satisfied.

$$60 \text{ degrees} \leq \varphi \leq 120 \text{ degrees} \tag{1}$$

$$60 \text{ degrees} \leq \psi \leq 120 \text{ degrees} \tag{2}$$

A distance LA indicates a distance between display panel 331 and the HMD 100. The distance LA is detected by distance sensor 64.

In the present exemplary embodiment, when the first condition and the second condition are satisfied, the second determining unit 312 determines that the display panel 331 faces the HMD 100, but the exemplary embodiment of the present disclosure is not limited thereto. When, in addition to the first condition and the second condition, a third condition described below is satisfied, the second determining unit 312 may determine that the display panel 331 faces the HMD 100.

Third condition: the distance LA between the first camera 61 and the HMD 100 is equal to or less than a threshold distance LS.

In other words, the second determining unit 312 determines, when the distance LA is equal to or less than the threshold distance LS, that the third condition is satisfied. The threshold distance LS is, for example, 0.8 m.

Further, for example, by setting a plurality of threshold distances (for example, 0.8 m, 0.5 m, and 0.3 m), the second determining unit 312 may change criteria for the determination of whether or not the display panel 331 faces the HMD 100 in accordance with the distance LA.

For example, as the distance LA shortens, the range of the inclination angle φ and the inclination angle ψ for which the display panel 331 is determined to be opposed to the HMD 100 narrows.

For example, when the distance LA is equal to or less than 0.8 m, the condition for determining that the display panel 331 faces the HMD 100 is to satisfy Equations (1) and (2) described above. In addition, when the distance LA is equal to or less than 0.5 m, the condition for determining that the display panel 331 faces the HMD 100 is to satisfy Equations (3) and (4) below.

$$70 \text{ degrees} \leq \varphi \leq 110 \text{ degrees} \tag{3}$$

$$70 \text{ degrees} \leq \psi \leq 110 \text{ degrees} \tag{4}$$

Furthermore, when the distance LA is equal to or less than 0.3 m, the condition for determining that the display panel 331 faces the HMD 100 is to satisfy Equations (5) and (6) that follow.

$$80 \text{ degrees} \leq \varphi \leq 100 \text{ degrees} \tag{5}$$

$$80 \text{ degrees} \leq \psi \leq 100 \text{ degrees} \tag{6}$$

Since as the distance LA shortens, the range of the inclination angle φ and the inclination angle ψ for which the display panel 331 is determined to be opposed to the HMD 100 narrows, the adjustment unit 315 can appropriately adjust the image of at least one of the first image P1 and the second image P2.

FIG. 7 is a diagram illustrating another example of a state in which the display panel 331 faces the HMD 100.

As illustrated in FIG. 7, when the user U operates the smart phone 300, the HMD 100 is typically disposed in a direction of a vector VN with respect to the display panel 331. The vector VN indicates a normal vector of the display surface of the display panel 331.

The HMD 100 is located within the second imaging range of the second camera 341. A center line CL indicates a center of the second imaging range of the second camera 341. The center line CL is parallel to the vector VN. In other words, the center line CL is orthogonal to a plane including the display surface of the display panel 331.

A range equal to or less than an inclination angle ηA with respect to the center line CL indicates the second imaging range. In other words, the inclination angle ηA corresponds to half an angle of view of the second camera 341.

A straight line LB indicates a straight line linking the second camera 341 to the first camera 61. An inclination angle ηB indicates an inclination angle of the straight line LB with respect to the center line CL. As illustrated in FIG. 7, the inclination angle ηB is less than the inclination angle ηA. Accordingly, an image of the first camera 61 is included in the second captured image captured by the second camera 341. Note that, the image of the first camera 61 is detected by performing image processing or the like on the second captured image.

When the image of the first camera 61 is included in the second captured image captured by the second camera 341, the second determining unit 312 determines that the HMD 100 is located within the second imaging range of the second camera 341. In other words, the second determining unit 312 determines that the second condition is satisfied.

In this way, the second determining unit 312 can, based on the second captured image captured by the second camera 341, determine whether the second condition is satisfied or not.

In the present exemplary embodiment, when the image of the first camera 61 is included in the second captured image captured by the second camera 341, the second determining unit 312 determines that the HMD 100 is located within the second imaging range of the second camera 341, but the exemplary embodiment of the present disclosure is not limited thereto. It is sufficient that the second determining unit 312 determines, based on the second captured image, whether or not the HMD 100 is located within the second imaging range of the second camera 341. For example, when an image of the right light-guiding plate 26 and the left light-guiding plate 28 is included in the second captured image captured by the second camera 341, the second determining unit 312 may determine that the HMD 100 is located within the second imaging range of the second camera 341.

2-2. Description of Processing of Adjustment Unit

Figure 8:
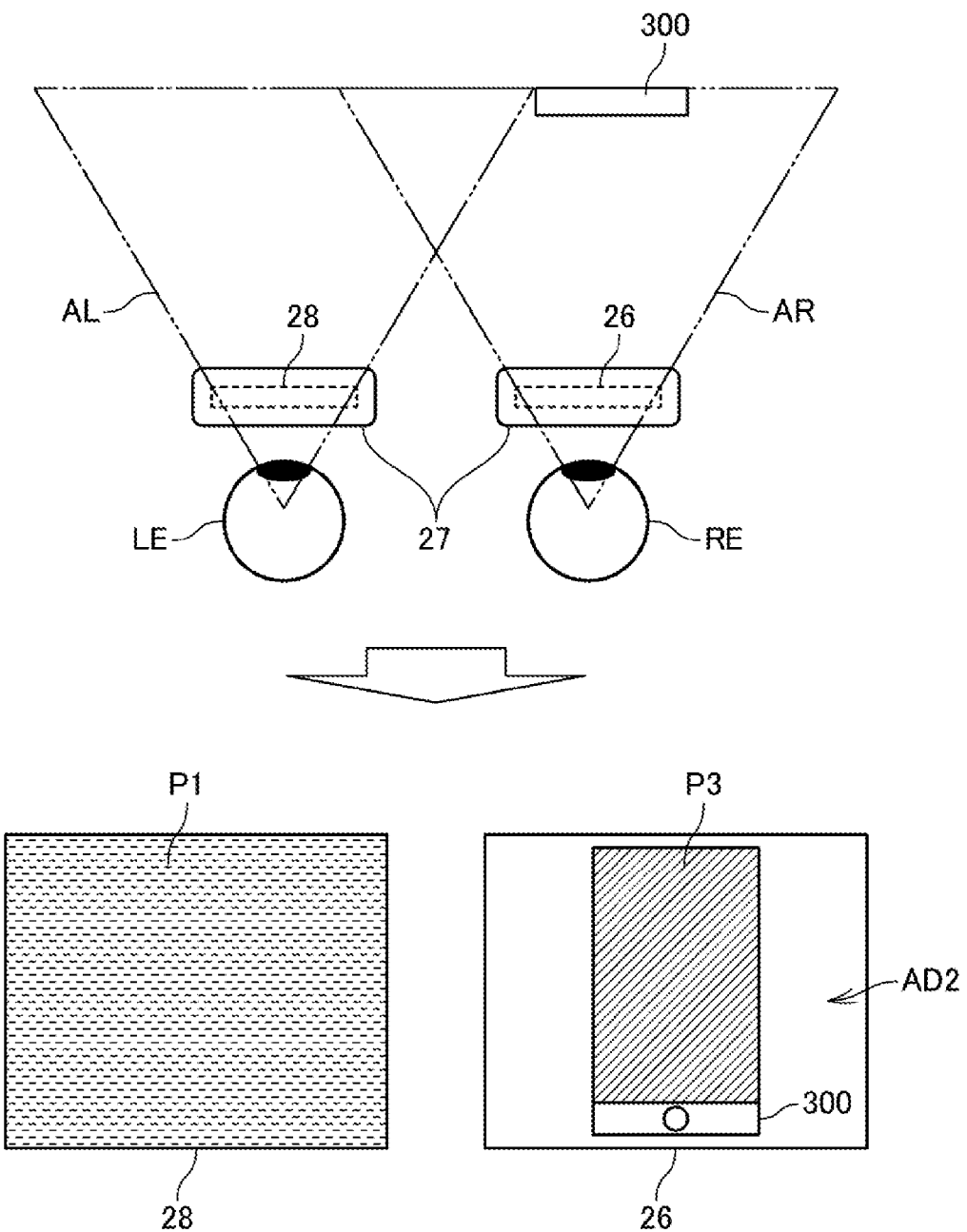
FIG. 8 is a diagram illustrating an example of a state in which a third image overlaps with a second image.

FIG. 8 is a diagram illustrating an example of a state in which the third image P3 overlaps with the second image P2. Note that, in FIG. 8 to FIG. 10, a case in which the display panel 331 faces the HMD 100 will be described. In other words, in FIG. 8 to FIG. 10, the second determining unit 312 determines that the display panel 331 faces the HMD 100.

A diagram on an upper side of FIG. 8 is a plan view illustrating a relationship between a right visual field range AR and a left visual field range AL, and a position of the smart phone 300. The right visual field range AR indicates a range of a visual field visually recognized by the right eye RE of the user U through the right light-guiding plate 26. The left visual field range AL indicates a range of a visual field visually recognized by the left eye LE of the user U through the left light-guiding plate 28.

As illustrated in the diagram on the upper side of FIG. 8, the smart phone 300 is located at a center portion of the right visual field range AR in a left and right direction. Note that, the smart phone 300 is located at a center portion of the right visual field range AR in a vertical direction as well. Moreover, the smart phone 300 is not included in the left visual field range AL.

In other words, the first detector 313 detects that the first image P1 does not overlap with the third image P3, and detects that the second image P2 overlaps with the third image P3.

Diagrams on a lower side of FIG. 8 illustrate an image visually recognized by the right eye RE of the user U through the right light-guiding plate 26, and an image visually recognized by the left eye LE of the user U through the left light-guiding plate 28, respectively. A right diagram on the lower side of FIG. 8 illustrates the image visually recognized by the right eye RE of the user U through the right light-guiding plate 26, and a left diagram on the lower side of FIG. 8 illustrates the image visually recognized by the left eye LE of the user U through the left light-guiding plate 28.

Since the first detector 313 detects that the first image P1 does not overlap with the third image P3, the adjustment unit 315 does not adjust the first image P1. Thus, the second display control unit 316 causes the left display unit 24 and the left light-guiding plate 28 to display the first image P1. As a result, as illustrated in the left diagram on the lower side of FIG. 8, the left eye LE of the user U visually recognizes the first image P1 through the left light-guiding plate 28. Since the first detector 313 detects that the second image P2 overlaps with the third image P3, the adjustment unit 315 adjusts the second image P2. Here, the adjustment unit 315 prohibits the display of the second image P2. Thus, the second display control unit 316 does not display the second image P2. As a result, as illustrated in the right diagram on the lower side of FIG. 8, the right eye RE of the user U visually recognizes the smart phone 300 that includes the third image P3 through the right light-guiding plate 26.

In this way, the user U can visually recognize the smart phone 300 including the third image P3 with the right eye RE, and can visually recognize the first image P1 with the left eye LE. Accordingly, the visibility of the third image P3 displayed on the display panel 331 of the smart phone 300 can be ensured, and reduction in the visibility of the first image P1 can be suppressed.

Figure 9:
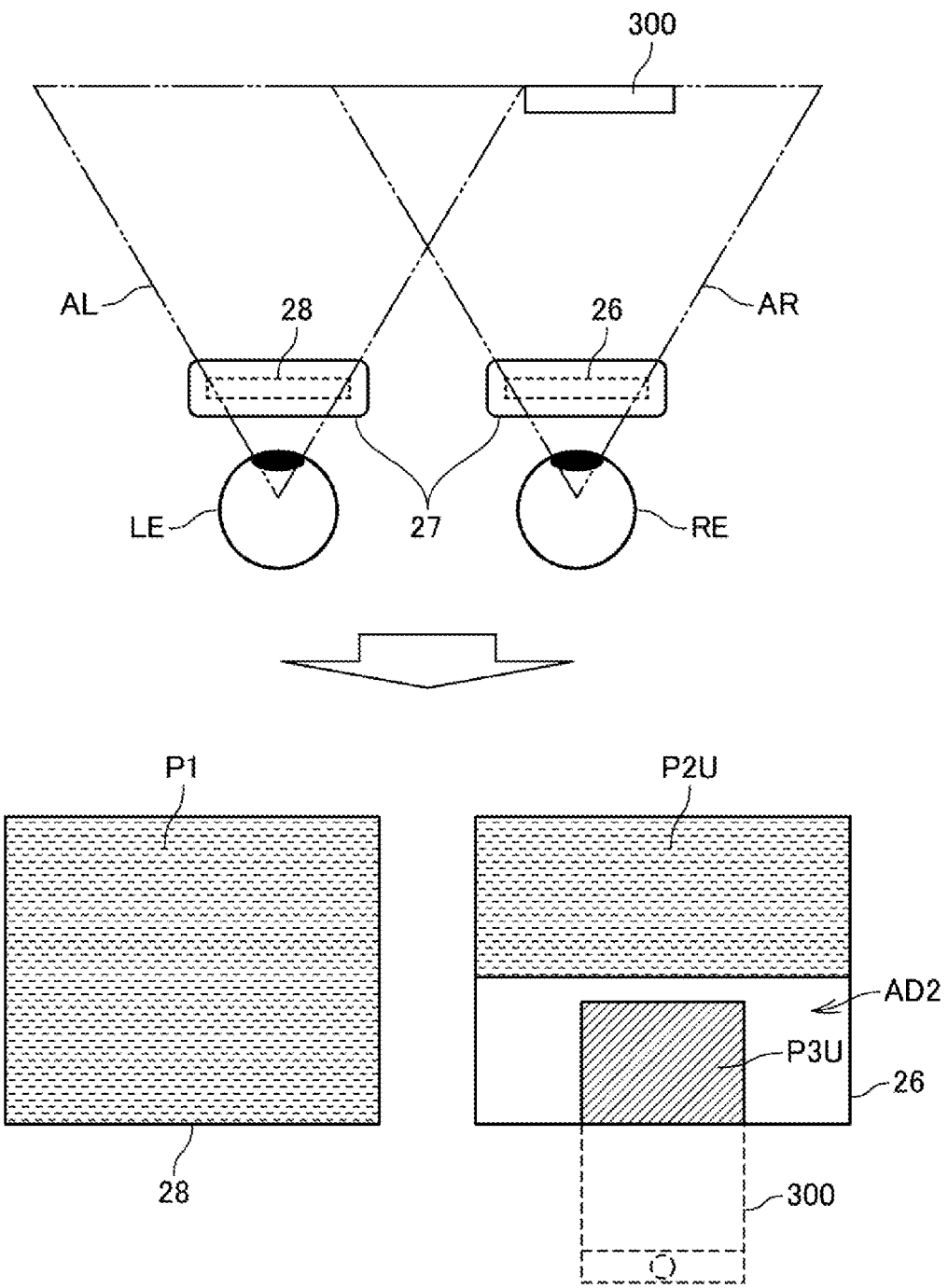
FIG. 9 is a diagram illustrating another example of the state in which the third image overlaps with the second image.

FIG. 9 is a diagram illustrating another example of the state in which the third image P3 overlaps with the second image P2. A diagram on an upper side of FIG. 9 is a plan view illustrating a relationship between the right visual field range AR and the left visual field range AL, and the position of the smart phone 300.

As illustrated in the diagram on the upper side of FIG. 9, the smart phone 300 is located at a center portion of the right visual field range AR in a left and right direction. Note that, the smart phone 300 is located at a lower portion of the right visual field range AR in a vertical direction. In other words, in FIG. 9, a position in the vertical direction of the smart phone 300 is different from that in FIG. 8. Moreover, the smart phone 300 is not included in the left visual field range AL.

In other words, the first detector 313 detects that the first image P1 does not overlap with the third image P3, and detects that the second image P2 overlaps with the third image P3.

A right diagram on the lower side of FIG. 9 illustrates an image visually recognized by the right eye RE of the user U through the right light-guiding plate 26, and a left diagram on the lower side of FIG. 9 illustrates an image visually recognized by the left eye LE of the user U through the left light-guiding plate 28.

Since the first detector 313 detects that the first image P1 does not overlap with the third image P3, the adjustment unit 315 does not adjust the first image P1. Thus, the second display control unit 316 causes the left display unit 24 and the left light-guiding plate 28 to display the first image P1. As a result, as illustrated in the left diagram on the lower side of FIG. 9, the left eye LE of the user U visually recognizes the first image P1 through the left light-guiding plate 28.

Since the first detector 313 detects that the second image P2 overlaps with the third image P3, the adjustment unit 315 adjusts the second image P2. The second detector 314 detects the second overlapping region AD2. The second overlapping region AD2 indicates a region in which the second image P2 overlaps with the third image P3. As illustrated in the right diagram on the lower side of FIG. 9, the second overlapping region AD2 corresponds to a lower region of the second image P2. Thus, the adjustment unit 315 prohibits display of an image corresponding to the second overlapping region AD2 of the second image P2. As a result, as illustrated in the right diagram on the lower side of FIG. 9, the right eye RE of the user U visually recognizes a second upper image P2U and a third upper image P3U, through the right light-guiding plate 26. The second upper image P2U corresponds to an upper region of the second image P2. The third upper image P3U corresponds to an upper region of the third image P3.

In this way, the user U can visually recognize the second upper image P2U and the third upper image P3U with the right eye RE, and visually recognize the first image P1 with the left eye LE. Accordingly, the visibility of the third image P3 displayed on the display panel 331 of the smart phone 300 can be ensured, and reduction in the visibility of the first image P1 and the second image P2 can be suppressed.

Figure 10:
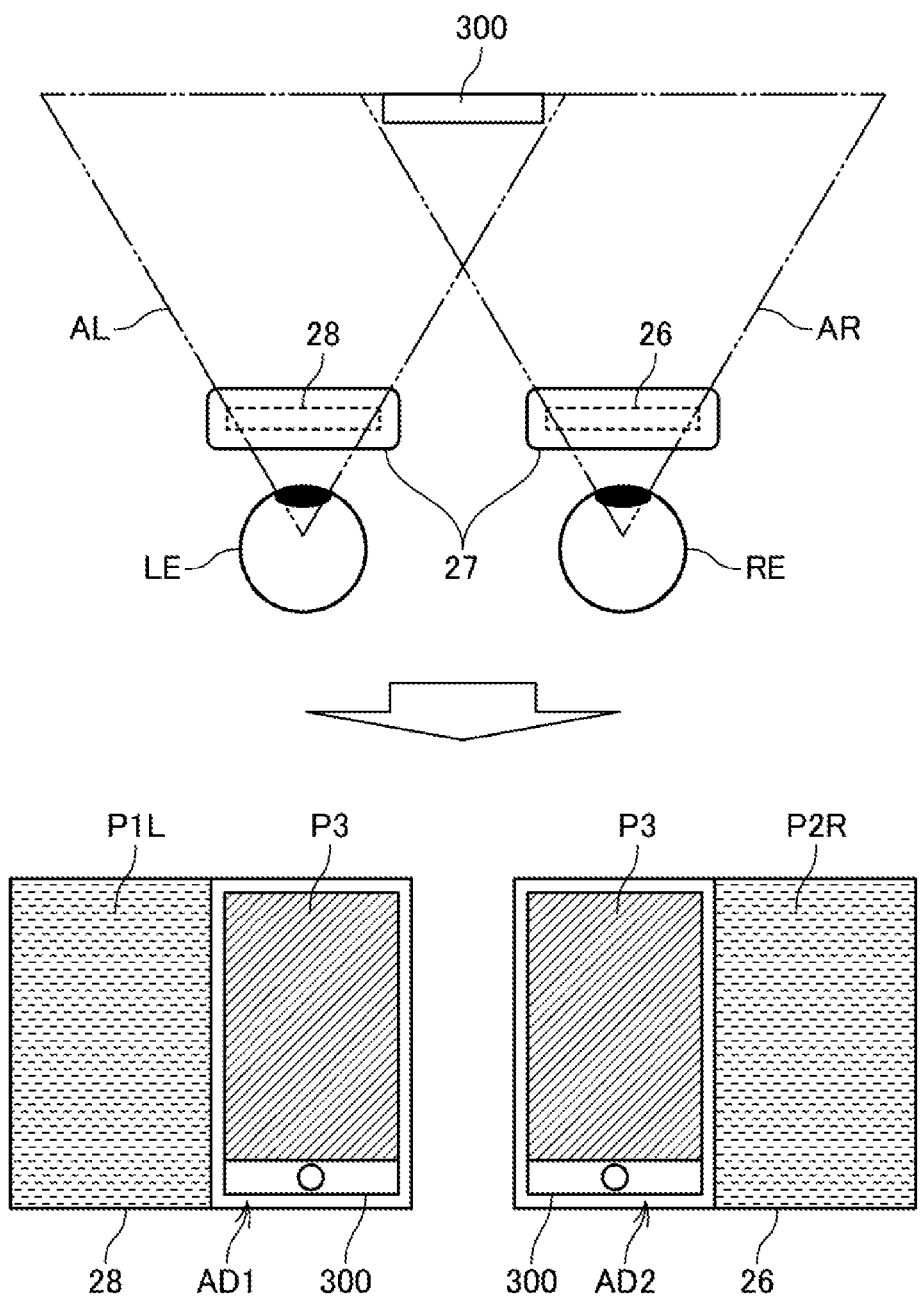
FIG. 10 is a diagram illustrating an example of a state in which the third image overlaps with a first image and the second image.

FIG. 10 is a diagram illustrating an example of a state in which the third image P3 overlaps with the first image P1 and the second image P2. A diagram on an upper side of FIG. 10 is a plan view illustrating a relationship between the right visual field range AR and the left visual field range AL, and a position of the smart phone 300.

As illustrated in the diagram on the upper side of FIG. 10, the smart phone 300 is located at a left portion of the right visual field range AR in a left and right direction. Further, the smart phone 300 is located at a right portion in the left and right direction of the left visual field range AL. Note that, the smart phone 300 is located at a center portion of each of the right visual field range AR and the left visual field range AL in a vertical direction. In other words, in FIG. 10, the position in the left and right direction of the smart phone 300 is different from that in FIG. 8.

A right diagram on a lower side of FIG. 10 illustrates an image visually recognized by the right eye RE of the user U through the right light-guiding plate 26, and a left diagram on the lower side of FIG. 10 illustrates an image visually recognized by the left eye LE of the user U through the left light-guiding plate 28.

Since the first detector 313 detects that the first image P1 overlaps with the third image P3, the adjustment unit 315 adjusts the first image P1. The second detector 314 detects the first overlapping region AD1. The first overlapping region AD1 indicates a region in which the first image P1 overlaps with the third image P3. As illustrated in a left diagram on the lower side of FIG. 10, the first overlapping region AD1 corresponds to a right region of the first image P1. Thus, the adjustment unit 315 prohibits display of an image corresponding to the first overlapping region AD1 of the first image P1. As a result, as illustrated in the left diagram on the lower side of FIG. 10, the left eye LE of the user U visually recognizes a first left image P1L and the third image P3 through the left light-guiding plate 28. The first left image P1L corresponds to a left region of the first image P1.

Since the first detector 313 detects that the second image P2 overlaps with the third image P3, the adjustment unit 315 adjusts the second image P2. The second detector 314 detects the second overlapping region AD2. The second overlapping region AD2 indicates a region in which the second image P2 overlaps with the third image P3. As illustrated in the right diagram on the lower side of FIG. 10, the second overlapping region AD2 corresponds to a left region of the second image P2. Thus, the adjustment unit 315 prohibits display of an image corresponding to the second overlapping region AD2 of the second image P2. As a result, as illustrated in the right diagram on the lower side of FIG. 10, the right eye RE of the user U visually recognizes a second right image P2R and the third image P3, through the right light-guiding plate 26. The second right image P2R corresponds to a right region of the second image P2.

In this way, the user U can visually recognize the second right image P2R and the third image P3 with the right eye RE, and visually recognize the first left image P1L and the third image P3 with the left eye LE. Accordingly, the visibility of the third image P3 displayed on the display panel 331 of the smart phone 300 can be ensured, and reduction in the visibility of the first image P1 and the second image P2 can be suppressed.

3. Description of Processing of Second Control Unit of Smart Phone

Figure 11:
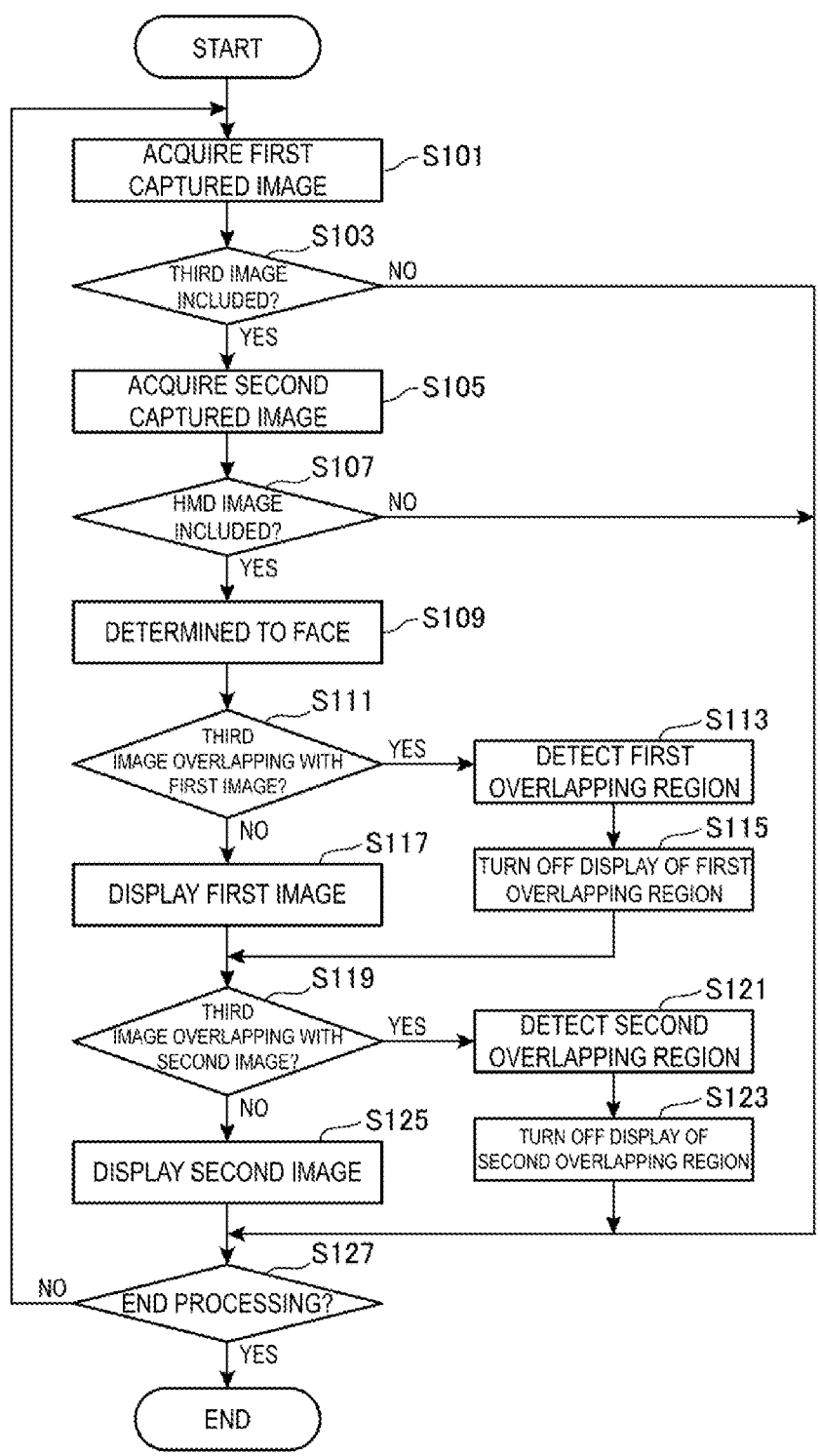
FIG. 11 is a flowchart illustrating an example of processing of a second control unit.

FIG. 11 is a flowchart illustrating an example of processing of the second control unit 310 of the smart phone 300.

First, as illustrated in FIG. 11, in step S101, the second control unit 310 acquires a first captured image captured by the first camera 61.

Next, in step S103, the second determining unit 312 determines whether the display panel 331 is located within a first imaging range of the first camera 61 or not. In other words, the second determining unit 312 determines whether the first captured image captured by the first camera 61 includes the third image P3 displayed on the display panel 331 or not.

When the second determining unit 312 determines that the first captured image does not include the third image P3 (step S103; NO), the processing proceeds to step S127. When the second determining unit 312 determines that the first captured image includes the third image P3 (step S103; YES), the processing proceeds to step S105.

Then, in step S105, the second control unit 310 acquires a second captured image captured by the second camera 341.

Next, in step S107, the second determining unit 312 determines whether the HMD 100 is located within a second imaging range of the second camera 341 or not. In other words, the second determining unit 312 determines whether the second captured image captured by the second camera 341 includes an image of the HMD 100 or not. The image of the HMD 100 is, in the present exemplary embodiment, as described with reference to FIG. 7, for example, an image of the first camera 61 of the HMD 100.

When the second determining unit 312 determines that the second captured image does not include the image of the HMD 100 (step S107; NO), the processing proceeds to step S127. When the second determining unit 312 determines that the second captured image includes the image of the HMD 100 (step S107; YES), the processing proceeds to step S109.

Then, in step S109, the second determining unit 312 determines that the display panel 331 faces the HMD 100.

Next, in step S111, the first detector 313 determines whether the third image P3 overlaps with the first image P1 or not.

When the first detector 313 determines that the third image P3 does not overlap with the first image P1 (step S111; NO), the processing proceeds to step S117.

Then, in step S117, the second display control unit 316 causes the left display unit 24 and the left light-guiding plate 28 to display the first image P1. Subsequently, the processing proceeds to step S119.

When the first detector 313 determines that the third image P3 overlaps with the first image P1 (step S111; YES), the processing proceeds to step S113.

Then, in step S113, the second detector 314 detects the first overlapping region AD1 indicating a region where the first image P1 overlaps with the third image P3.

Next, in step S115, the adjustment unit 315 prohibits display of the first overlapping region AD1 in the first image P1, and the second display control unit 316 causes the left display unit 24 and the left light-guiding plate 28 to display the first image P1 after adjustment. Subsequently, the processing proceeds to step S119.

Next, in step S119, the first detector 313 determines whether the third image P3 overlaps with the second image P2 or not.

When the first detector 313 determines that the third image P3 does not overlap with the second image P2 (step S119; NO), the processing proceeds to step S125.

Then, in step S125, the second display control unit 316 causes the right display unit 22 and the right light-guiding plate 26 to display the second image P2. Subsequently, the processing proceeds to step S127.

When the first detector 313 determines that the third image P3 overlaps with the second image P2 (step S119; YES), the processing proceeds to step S121.

Then, in step S121, the second detector 314 detects the second overlapping region AD2 indicating a region where the second image P2 overlaps with the third image P3.

Next, in step S123, the adjustment unit 315 prohibits display of the second overlapping region AD2 in the second image P2, and the second display control unit 316 causes the right display unit 22 and the right light-guiding plate 26 to display the second image P2 after adjustment. Subsequently, the processing proceeds to step S127.

Then, in step S127, the second control unit 310 determines whether to end the processing or not.

When the second control unit 310 determines not to end the process (step S127; no), the process returns to step S101. When the second control unit 310 determines to end the processing (step S127; YES), the processing is ended.

Note that, step S111 and step S119 in FIG. 11 correspond to an example of a "detection step". Steps S115 and S123 correspond to an example of an "adjustment step" and also correspond to an example of a "display control step". Note that, step S117 and step S125 correspond to an example of the "display control step".

4. Effects of Exemplary Embodiment

An described above, the display system 1 according to the present exemplary embodiment is the display system 1 including the HMD 100 mounted on the head of the user U, and the smart phone 300 to which the HMD 100 is coupled, wherein the HMD 100 includes the left display unit 24 and the left light-guiding plate 28 located on the left eye LE side of the user U, and overlapping and displaying the first image P1 on the external scene, and the right display unit 22 and the right light-guiding plate 26 located on the right eye RE side of the user U, and overlapping and displaying the second image P2 corresponding to the first image P1 on the external scene, the smart phone 300 includes the display panel 331 for displaying the third image P3, the first detector 313 for detecting that at least one of the first image P1 and the second image P2 overlaps with the third image P3, the adjustment unit 315, based on a detection result in the first detector 313, in order for the third image P3 to be visible, for adjusting the image of at least one of the first image P1 and the second image P2, and the second display control unit 316, based on an adjustment result in the adjustment unit 315, for causing the left display unit 24 and the left light-guiding plate 28 to display the first image P1, and causing the right display unit 22 and the right light-guiding plate 26 to display the second image P2.

Thus, in order for the third image P3 to be visible, the image of at least one of the first image P1 and the second image P2 is adjusted, and based on adjustment results in the adjustment unit 315, the left display unit 24 and the left light-guiding plate 28 are caused to display the first image P1, and the right display unit 22 and the right light-guiding plate 26 are caused to display the second image P2, thus reduction in the visibility of the third image P3 displayed on the display panel 331 of the smart phone 300 can be suppressed.

Further, the adjustment unit 315, in order for the second image P2 to be different from the first image P1, adjusts the image of at least one of the first image P1 and the second image P2.

Thus, in order for the second image P2 to be different from the first image P1, the image of at least one of the first image P1 and the second image P2 is adjusted, thus reduction in the visibility of at least one of the first image P1 and the second image P2 can be suppressed, as described with reference to FIG. 8 to FIG. 10.

Further, when the first detector 313 detects that the first image P1 overlaps with the third image P3, the adjustment unit 315 adjusts the first image P1, and when the first detector 313 detects that the second image P2 overlaps with the third image P3, adjusts the second image P2.

Thus, when the first image P1 overlaps with the third image P3, the first image P1 is adjusted, and when the second image P2 overlaps with the third image P3, the second image P2 is adjusted, and thus, in a simple process, reduction in the visibility of the third image P3 can be suppressed. In addition, in a simple process, reduction in the visibility of at least one of the first image P1 and the second image P2 can be suppressed.

Further, when the first detector 313 detects that the first image P1 overlaps with the third image P3, the adjustment unit 315 prohibits the display of the first image P1, and when the first detector 313 detects that the second image P2 overlaps with the third image P3, prohibits the display of the second image P2.

Thus, when the first image P1 overlaps with the third image P3, the display of the first image P1 is prohibited, and when the second image P2 overlaps with the third image P3, the display of the second image P2 is prohibited, and thus, in a simple process, reduction in the visibility of the third image P3 can be suppressed. In addition, in a simple process, reduction in the visibility of at least one of the first image P1 and the second image P2 can be suppressed.

Further, when the first detector 313 detects that the first image P1 overlaps with the third image P3, the adjustment unit 315 adjusts the transmittance of the first image P1, and when the first detector 313 detects that the second image P2 overlaps with the third image P3, adjusts the transmittance of the second image P2.

Thus, when the first image P1 overlaps with the third image P3, the transmittance of the first image P1 is adjusted, and thus, compared to the case where the display of the first image P1 is prohibited, reduction in the visibility of the first image P1 can be suppressed. Further, when the second image P2 overlaps with the third image P3, the transmittance of the second image P2 is adjusted, and thus, compared to the case where the display of the second image P2 is prohibited, reduction in the visibility of the second image P2 can be suppressed.

Additionally, the smart phone 300 includes the second detector 314 that, when the first detector 313 detects that the first image P1 overlaps with the third image P3, detects the first overlapping region AD1 indicating a region where the first image P1 overlaps with the third image P3, and when the first detector 313 detects that the second image P2 overlaps with the third image P3, detects the second overlapping region AD2 indicating a region where the second image P2 overlaps with the third image P3, and the adjustment unit 315, based on a detection result in the second detector 314, adjusts the image of at least one of the first image P1 and the second image P2.

Accordingly, based on the first overlapping region AD1 and the second overlapping region AD2, the image of at least one of the first image P1 and the second image P2 is adjusted, thus reduction in the visibility of the first image P1 and the second image P2 can be further suppressed.

Further, when the first detector 313 detects that the first image P1 overlaps with the third image P3, the adjustment unit 315 prohibits the display of the first overlapping region AD1 in the first image P1, and when the first detector 313 detects that the second image P2 overlaps with the third image P3, prohibits the display of the second overlapping region AD2 in the second image P2.

Thus, when the first image P1 overlaps with the third image P3, the display of the first overlapping region AD1 is prohibited, and thus, compared to the case where the display of the first image P1 is prohibited, reduction in the visibility of the first image P1 can be suppressed. Further, when the second image P2 overlaps with the third image P3, the display of the second overlapping region AD2 is prohibited, and thus, compared to the case where the display of the second image P2 is prohibited, reduction in the visibility of the second image P2 can be suppressed.

Further, when the first detector 313 detects that the first image P1 overlaps with the third image P3, the adjustment unit 315 adjusts the transmittance of the first overlapping region AD1 in the first image P1, and when the first detector 313 detects that the second image P2 overlaps with the third image P3, adjusts the transmittance of the second overlapping region AD2 in the second image P2.

Thus, when the first image P1 overlaps with the third image P3, the transmittance of the first overlapping region AD1 is adjusted, and thus, compared to the case where the display of the first overlapping region AD1 is prohibited, reduction in the visibility of the first image P1 can be suppressed. Further, when the second image P2 overlaps with the third image P3, the transmittance of the second overlapping region AD2 is adjusted, and thus, compared to the case where the display of the second overlapping region AD2 is prohibited, reduction in the visibility of the second image P2 can be suppressed.

Additionally, the HMD 100 includes the first camera 61 for capturing the first imaging range of the external scene, and the first detector 313, based on an imaging result of the first camera 61, detects that at least one of the first image P1 and the second image P2 overlaps with the third image P3, and the second detector 314, based on the imaging result of the first camera 61, detects the first overlapping region AD1 and the second overlapping region AD2.

Accordingly, the first detector 313 and the second detector 314 can be realized with a simple configuration.

Further, the HMD 100 includes the first camera 61 for capturing the first imaging range of the external scene, the smart phone 300 includes the first determining unit 311 for determining, based on the imaging result of the first camera 61, whether the smart phone 300 is grasped by the left hand or the right hand, and the first detector 313, when the first determining unit 311 determines that the smart phone 300 is grasped by the left hand, detects that the first image P1 overlaps with the third image P3, and when the first determining unit 311 determines that the smart phone 300 is grasped by the right hand, detects that the second image P2 overlaps with the third image P3.

Thus, in a simple process, it can be detected that the first image P1 overlaps with the third image P3, and that the second image P2 overlaps with the third image P3.

Further, the smart phone 300 includes the second determining unit 312 that determines whether the display panel 331 faces the HMD 100 or not, and when the second determining unit 312 determines that the display panel 331 faces the HMD 100, the adjustment unit 315 adjusts the image of at least one of the first image P1 and the second image P2.

Accordingly, when the display panel 331 faces the HMD 100, the image of at least one of the first image P1 and the second image P2 is adjusted, and thus the first image P1 and the second image P2 can be adjusted appropriately. For example, when the display panel 331 does not face the HMD 100, the images of the first image P1 and the second image P2 are not adjusted, and thus the first image P1 and the second image P2 can be adjusted appropriately.

In addition, the HMD 100 includes the first camera 61 for capturing the first imaging range of the external scene, the smart phone 300 includes the second camera 341 for capturing the second imaging range of the external scene, and the second determining unit 312, based on an image captured by the first camera 61 and an image captured by the second camera 341, determines whether the display panel 331 of the smart phone 300 faces the HMD 100 or not.

Accordingly, based on the image captured by the first camera 61 and the image captured by the second camera 341, whether the display panel 331 of the smart phone 300 faces the HMD 100 or not is determined, thus it is possible to appropriately determine whether the display panel 331 faces the HMD 100 or not.

The control program according to the present exemplary embodiment is a control program for the smart phone 300 to which the HMD 100 is coupled that is mounted on the head of the user U, and includes the left display unit 24 and the left light-guiding plate 28, located on the left eye LE side of the user U, and overlapping and displaying the first image P1 on the external scene, and the right display unit 22 and the right light-guiding plate 26, located on the right eye RE side of the user U, and overlapping and displaying the second image P2 corresponding to the first image P1 on the external scene, and that includes the display panel 331 for displaying the third image P3, and the second processor 310A, wherein the second processor 310A is caused to function as the first detector 313 for detecting that at least one of the first image P1 and the second image P2 overlaps with the third image P3, as the adjustment unit 315, based on a detection result in the first detector 313, in order for the third image P3 to be visible, for adjusting the image of at least one of the first image P1 and the second image P2, and as the second display control unit 316, based on an adjustment result in the adjustment unit 315, for causing the left display unit 24 and the left light-guiding plate 28 to display the first image P1, and causing the right display unit 22 and the right light-guiding plate 26 to display the second image P2.

Thus, in order for the third image P3 to be visible, the image of at least one of the first image P1 and the second image P2 is adjusted, and based on an adjustment results in the adjustment unit 315, the left display unit 24 and the left light-guiding plate 28 are caused to display the first image P1, and the right display unit 22 and the right light-guiding plate 26 are caused to display the second image P2, thus reduction in the visibility of the third image P3 displayed on the display panel 331 of the smart phone 300 can be suppressed.

A control method for the smart phone 300 according to the present exemplary embodiment is a control program for the smart phone 300 to which the HMD 100 is coupled that is mounted on the head of the user U, and includes the left display unit 24 and the left light-guiding plate 28, located on the left eye LE side of the user U, and overlapping and displaying the first image P1 on the external scene, and the right display unit 22 and the right light-guiding plate 26, located on the right eye RE side of the user U, and overlapping and displaying the second image P2 corresponding to the first image P1 on the external scene, and that includes the display panel 331 for displaying the third image P3, and the second processor 310A, and the control method includes a detection step by the second processor 310A, for detecting that at least one of the first image P1 and the second image P2 overlaps with the third image P3, an adjustment step by the second processor 310A, for adjusting, based on a detection result in the detection step, in order for the third image P3 to be visible, the image of at least one of the first image P1 and the second image P2, and a display control step by the second processor 310A, for causing the left display unit 24 and the left light-guiding plate 28 to display the first image P1, and causing the right display unit 22 and the right light-guiding plate 26 to display the second image P2, based on an adjustment result in the adjustment step.

Thus, in order for the third image P3 to be visible, the image of at least one of the first image P1 and the second image P2 is adjusted, and based on an adjustment result in the adjustment step, the left display unit 24 and the left light-guiding plate 28 are caused to display the first image P1, and the right display unit 22 and the right light-guiding plate 26 are caused to display the second image P2, thus reduction in the visibility of the third image P3 displayed on the display panel 331 of the smart phone 300 can be suppressed.

The HMD 100 according to another exemplary embodiment of the present disclosure is the HMD 100 including the image display unit 20 mounted on the head of the user U, the smart phone 300 having the display panel 331 for displaying the third image P3, and the connection device 10 to which the image display unit 20 is coupled, wherein the image display unit 20 includes the left display unit 24 and the left light-guiding plate 28 located on the left eye LE side of the user U, and overlapping and displaying the first image P1 on the external scene, and the right display unit 22 and the right light-guiding plate 26 located on the right eye RE side of the user U, and overlapping and displaying the second image P2 corresponding to the first image P1 on the external scene, the connection device 10 includes the first detector 313 for detecting that at least one of the first image P1 and the second image P2 overlaps with the third image P3, the adjustment unit 315, based on a detection result in the first detector 313, in order for the third image P3 to be visible, for adjusting the image of at least one of the first image P1 and the second image P2, and the second display control unit 316, based on an adjustment result in the adjustment unit 315, for causing the left display unit 24 and the left light-guiding plate 28 to display the first image P1, and causing the right display unit 22 and the right light-guiding plate 26 to display the second image P2.

Thus, in order for the third image P3 to be visible, the image of at least one of the first image P1 and the second image P2 is adjusted, and based on an adjustment results in the adjustment unit 315, the left display unit 24 and the left light-guiding plate 28 are caused to display the first image P1, and the right display unit 22 and the right light-guiding plate 26 are caused to display the second image P2, thus reduction in the visibility of the third image P3 displayed on the display panel 331 of the smart phone 300 can be suppressed.

5. Other Exemplary Embodiments

The present disclosure is not limited to the configurations in the exemplary embodiment described above, and can be implemented in various aspects without departing from the gist of the disclosure.

For example, in the above exemplary embodiment, the "information processing device" is, but is not limited to, the smart phone 300. It is sufficient that, the "information processing device" is configured to be portable by the user U, and includes a display unit, an operation unit, and a control unit. For example, the "information processing device" may be a PDA terminal or a tablet personal computer.

Further, in the exemplary embodiment described above, the configuration in which the connection device 10 is coupled to the image display unit 20 by wire has been illustrated, however, the present disclosure is not limited thereto, and a configuration may be adopted in which the image display unit 20 is coupled wirelessly to the connection device 10.

For example, in the exemplary embodiment described above, the configuration in which the connection device 10 is coupled to the smart phone 300 by wire has been illustrated, however, the present disclosure is not limited thereto, and a configuration may be adopted in which the smart phone 300 is coupled wirelessly to the connection device 10.

Additionally, a part of the functions of the connection device 10 may be provided in the image display unit 20, and the connection device 10 may be achieved by a plurality of devices. For example, instead of the connection device 10, a wearable device that can be attached to a body or clothes of the user U, or to personal adornments worn by the user may be used. The wearable device in such a case may be, for example, a watch-like device, a ring-like device, a laser pointer, a mouse, an air mouse, a game controller, a pen-like device, or the like.

In addition, in the exemplary embodiment described above, the configuration in which the image display unit 20 and the connection device 10 are separated, and are coupled to each other via the coupling cable 40 has been illustrated as an example. The disclosure is not limited to this, and a configuration may be adopted in which the connection device 10 and the image display unit 20 are integrally formed at and mounted on the head of the user U.

Further, in the exemplary embodiment described above, the configuration in which the user U visually recognizes the external scene through the display unit is not limited to a configuration in which the right light-guiding plate 26 and the left light-guiding plate 28 transmit outside light. For example, the present disclosure is applicable to a display device configured to display an image in a state where an external scene cannot be visually recognized. Specifically, the present disclosure can be applied to a display apparatus configured to display captured images captured by the first camera 61, images and CG generated based on the captured images, and images and the like based on image data stored beforehand, or images and the like based on image data input from outside. For example, with a configuration in which a composite image created by combining together an image of the external scene captured by the first camera 61, and a display image are displayed by the image display unit 20, even when the image display unit 20 may not transmit outside light, the external scene and the image can be displayed so as to be visible by the user U. Of course, it is also possible to apply the present disclosure to such a so-called video see-through display apparatus.

Additionally, for example, instead of the image display unit 20, an image display unit of another type such as an image display unit worn as a hat may be adopted, as long as the image display unit includes a display unit configured to display an image in correspondence to the left eye LE of the user U, and a display unit configured to display an image in correspondence to the right eye RE of the user U. Additionally, the display device may be configured, for example, as an HMD mounted on a vehicle such as a car and an airplane. Further, the display device may be configured, for example, as an HMD built into a body protector tool such as a helmet. In this case, a positioning portion to be positioned on the body of the user U, and a portion to be positioned to the configured portion may be a mounting portion.

Additionally, the configuration in which a virtual image is formed by the half mirrors 261 and 281 at a part of the right light-guiding plate 26 and the left light-guiding plate 28, as an optical system configured to guide imaging light to the eyes of the user U has been illustrated. The present disclosure is not limited thereto, and a configuration may be adopted in which an image is displayed either on an entire surface of the right light-guiding plate 26 and the left light-guiding plate 28, or in a display region having an area that occupies most part of the right light-guiding plate 26 and the left light-guiding plate 28. In such a case, a process for reducing an image may be included in an operation for changing a display position of the image.

In addition, the optical elements are not limited to the right light-guiding plate 26 and the left light-guiding plate 28 having half mirrors 261 and 281, but any optical components that allow the imaging light to enter the eyes of the user U, and specifically, diffraction grating, prisms, and holographic display units may be employed.

In addition, such a configuration may be adopted that at least some of the function blocks illustrated in FIG. 4 and FIG. 5 and the like are achieved with hardware, or achieved together with hardware and software, and the present disclosure is not limited to a configuration in which independent hardware resources are arranged as illustrated in the figures.

Additionally, the second control program executed by the second control unit 310 may be stored in a non-volatile storage unit or another storage unit in the second control device 310. Such a configuration may be adopted in which the second control program stored in external devices is acquired via a communication unit and the like and is executed.

Additionally, duplicate of a configuration formed in the connection device 10 may be formed in the image display unit 20. For example, a processor similar to the first processor in the connection device 10 may be arranged in the image display unit 20, or the first processor included in the connection device 10 and the processor of the image display unit 20 may be configured to perform separate functions.

Further, processing units in the flowchart illustrated in FIG. 11 are obtained by dividing the processing based on main processing contents in order to facilitate the understanding of the processing in the second control unit 310 of the smart phone 300. Exemplary embodiments will not be limited by the manner and name of division of the processing unit illustrated in the flowchart illustrated in FIG. 11. Further, the processing of the second control unit 310 can be divided into more processing units in accordance with a processing content, and can be divided such that one processing unit includes more processing. An order of the processing in the above-described flowchart is also not limited to the illustrated example.

Furthermore, a part or all of the processing of the second control unit 310 may be executed by the first control unit 120.

Additionally, the control method of the smart phone 300 can be realized by causing the second processor 310A included in the smart phone 300 to execute the second control program corresponding to the control method for the smart phone 300. Furthermore, the second control program can also be recorded in a recording medium recorded so as to be readable by a computer. The recording medium can be a magnetic recording medium, an optical recording medium, or a semiconductor memory device. Specifically, a portable or stationary type recording medium, such as a flexible disk, a Compact Disk Read Only Memory (CD-ROM), a Digital Versatile Disc (DVD), a Blu-ray (trade name) disc, a magneto-optical disc, a flash memory, a card type recording medium, or the like may be exemplified. The recording medium may be non-volatile storage devices such as a RAM, a ROM, and an HDD, all representing internal storages included in an image display apparatus. Additionally, the second control program corresponding to the control method for the smart phone 300 is stored in a server apparatus or the like, and thus the control method for the smart phone 300 can be achieved by downloading the second control program from the server apparatus to the smart phone 300.

What is claimed is:

1. A display system, comprising:
   a display device mounted on a head of a user; and
   an information processing device to which the display device is coupled, wherein
   the display device includes
   a first display located at a left eye side of the user and displaying a first image overlapping an external scene, and
   a second display located at a right eye side of the user and displaying a second image corresponding to the first image overlapping the external scene,
   the information processing device includes
   a third display displaying a third image,
   a first detector detecting that at least one of the first image and the second image overlaps the third image,
   a processor configured to function as,
      an adjustment unit adjusting, based on a detection result of the first detector, an image of at least one of the first image and the second image such that the third image is visible, and
      a display control unit causing, based on an adjustment result of the adjustment unit, the first display to display the first image and the second display to display the second image,
   wherein the adjustment unit, when the first detector detects that the first image overlaps the third image, prohibits display of the first image, and
   when the first detector detects that the second image overlaps the third image, prohibits display of the second image.

2. The display system according to claim 1, wherein the adjustment unit adjusts an image of at least one of the first image and the second image such that the second image differs from the first image.

3. The display system according to claim 1, wherein
the information processing device includes a second detector that, when the first detector detects that the first image overlaps the third image, detects a first overlapping region indicating a region where the first image overlaps the third image, and that, when the first detector detects that the second image overlaps the third image, detects a second overlapping region indicating a region where the second image overlaps the third image, and
the adjustment unit adjusts, based on a detection result of the second detector, an image of at least one of the first image and the second image.

4. The display system according to claim 3, wherein
the adjustment unit,
when the first detector detects that the first image overlaps the third image, prohibits display of the first overlapping region in the first image, and
when the first detector detects that the second image overlaps the third image, prohibits display of the second overlapping region in the second image.

5. The display system according to claim 3, wherein
the adjustment unit,
when the first detector detects that the first image overlaps the third image, adjusts transmittance of the first overlapping region in the first image, and
when the first detector detects that the second image overlaps the third image, adjusts transmittance of the second overlapping region in the second image.

6. The display system according to claim 3, wherein
the display device includes a first image sensor image-capturing a first imaging range of the external scene,
the first detector detects, based on an imaging result of the first image sensor, that at least one of the first image and the second image overlaps the third image, and
the second detector detects, based on the imaging result of the first image sensor, the first overlapping region and the second overlapping region.

7. The display system according to claim 1, wherein
the display device includes a first image sensor image-capturing a first imaging range of the external scene,
the information processing device includes a processor configured to function as a first determining unit determining, based on an imaging result of the first image sensor, whether the information processing device is grasped by a left hand or grasped by a right hand,
the first detector,
when the first determining unit determines that the information processing device is grasped by the left hand, detects that the first image overlaps the third image, and
when the first determining unit determines that the information processing device is grasped by the right hand, detects that the second image overlaps the third image.

8. The display system according to claim 1, wherein
the information processing device includes a processor configured to function as a second determining unit determining whether the third display faces the display device, and
when the second determining unit determines that the third display faces the display device, the adjustment unit adjusts an image of at least one of the first image and the second image.

9. The display system according to claim 8, wherein
the display device includes a first image sensor image-capturing a first imaging range of the external scene,
the information processing device includes a second image sensor image-capturing a second imaging range of the external scene, and
the second determining unit determines, based on an image captured by the first image sensor and an image captured by the second image sensor, whether the third display of the information processing device faces the display device.

10. A method for controlling an information processing device to which a display device is coupled, the display device being mounted on a head of a user and including a first display located at a left eye side of the user and displaying a first image overlapping an external scene and a second display located at a right eye side of the user and displaying a second image corresponding to the first image overlapping the external scene, and which includes a third display displaying a third image, and moreover which includes a computer, the control method comprising:
a detection step of detecting by the computer that at least one of the first image and the second image overlaps the third image;
an adjustment step of adjusting by the computer an image of at least one of the first image and the second image, based on a detection result in the detection step, such that the third image is visible; and
a display control step of causing by the computer the first display to display the first image and causing by the computer the second display to display the second image, based on an adjustment result in the adjustment step,
wherein, the adjustment step prohibits display of the first image when the first image overlaps the third image, and prohibits display of the second image when the second image overlaps the third image.

11. A display system, comprising:
a display device mounted on a head of a user; and
an information processing device to which the display device is coupled, wherein
the display device includes
a first display located at a left eye side of the user and displaying a first image overlapping an external scene, and
a second display located at a right eye side of the user and displaying a second image corresponding to the first image overlapping the external scene,
the information processing device includes
a third display displaying a third image,
a first detector detecting that at least one of the first image and the second image overlaps the third image,
a processor configured to function as,
an adjustment unit adjusting, based on a detection result of the first detector, an image of at least one of the first image and the second image such that the third image is visible, and
a display control unit causing, based on an adjustment result of the adjustment unit, the first display to display the first image and the second display to display the second image,
wherein the adjustment unit, when the first detector detects that the first image overlaps the third image, adjusts transmittance of the first image, and
when the first detector detects that the second image overlaps the third image, adjusts transmittance of the second image.

12. A method for controlling an information processing device to which a display device is coupled, the display device being mounted on a head of a user and including a first display located at a left eye side of the user and displaying a first image overlapping an external scene and a second display located at a right eye side of the user and displaying a second image corresponding to the first image overlapping the external scene, and which includes a third display displaying a third image, and moreover which includes a computer, the control method comprising:

a detection step of detecting by the computer that at least one of the first image and the second image overlaps the third image;

an adjustment step of adjusting by the computer an image of at least one of the first image and the second image, based on a detection result in the detection step, such that the third image is visible; and a display control step of causing by the computer the first display to display the first image and causing by the computer the second display to display the second image, based on an adjustment result in the adjustment step, wherein the adjustment step adjusts transmittance of the first image when the first detector detects that the first image overlaps the third image, and adjusts transmittance of the second image when the first detector detects that the second image overlaps the third image.

* * * * *